(12) United States Patent
Taherzadeh Boroujeni et al.

(10) Patent No.: US 11,943,730 B2
(45) Date of Patent: Mar. 26, 2024

(54) SEARCH SPACE SPECIFIC DELAY BETWEEN A DOWNLINK CONTROL CHANNEL AND CORRESPONDING DOWNLINK/UPLINK DATA

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/370,960

(22) Filed: Jul. 8, 2021

(65) Prior Publication Data

US 2022/0015055 A1  Jan. 13, 2022

Related U.S. Application Data

(60) Provisional application No. 63/051,256, filed on Jul. 13, 2020.

(51) Int. Cl.
 *H04J 11/00* (2006.01)
 *H04W 56/00* (2009.01)
 (Continued)

(52) U.S. Cl.
 CPC ... *H04W 56/0055* (2013.01); *H04W 72/1263* (2013.01); *H04W 72/23* (2023.01)

(58) Field of Classification Search
 CPC . H04W 72/0446; H04W 72/23; H04W 24/08; H04W 72/1273; H04W 52/0235;
 (Continued)

(56) References Cited

U.S. PATENT DOCUMENTS 10,178,700 B2 *  1/2019  Eriksson ................ H04L 1/06
11,671,984 B2 *  6/2023  Park ...................... H04W 72/54
                                                370/329
(Continued)

FOREIGN PATENT DOCUMENTS

WO    2020065624 A1    4/2020

OTHER PUBLICATIONS

International Search Report and Written Opinion—PCT/US2021/041147—ISA/EPO—dated Oct. 28, 2021.
(Continued)

*Primary Examiner* — Jung Liu
(74) *Attorney, Agent, or Firm* — Loza & Loza, LLP

(57) ABSTRACT

Aspects relate to configuring a delay between a downlink control channel and a downlink/uplink. For example, the base station determines first search spaces indicating potential locations for a first downlink control channel and/or second search spaces indicating potential locations for a second downlink control channel. The base station configures and transmits first delays and/or second delays. Each first delay indicates a respective time delay between a resource location of the first downlink control channel and a resource location of a downlink data associated with the first downlink control channel and is configured for a respective first search space of the first search spaces. Each second delay indicates a respective time delay between a resource location of the second downlink control channel and a resource location of an uplink data associated with the second downlink control channel and is configured for a respective second search space of the second search spaces.

30 Claims, 18 Drawing Sheets

(51) Int. Cl.
*H04W 72/1263* (2023.01)
*H04W 72/23* (2023.01)

(58) Field of Classification Search
CPC . H04W 52/0216; H04W 76/28; H04W 72/12; H04W 52/0229; H04W 52/0258; H04L 1/1896; H04L 5/0094; H04L 5/0053; H04L 1/1819; H04L 1/1864; H04L 1/1854; H04L 1/1822; H04L 5/001; H04L 5/0007; Y02D 30/70
See application file for complete search history.

(56) References Cited

U.S. PATENT DOCUMENTS

| | | | | |
|---|---|---|---|---|
| 2019/0207796 | A1* | 7/2019 | Hwang | H04L 27/2676 |
| 2019/0305867 | A1* | 10/2019 | Tseng | H04L 5/0094 |
| 2020/0107345 | A1 | 4/2020 | Ang et al. | |
| 2021/0385848 | A1* | 12/2021 | Hwang | H04W 72/23 |
| 2021/0400699 | A1* | 12/2021 | Nory | H04W 72/0446 |
| 2022/0353893 | A1* | 11/2022 | Choi | H04L 5/0053 |
| 2023/0049043 | A1* | 2/2023 | Li | H04L 1/1864 |
| 2023/0079377 | A1* | 3/2023 | Srinivasan | H04W 8/24 |
| 2023/0188268 | A1* | 6/2023 | Yan | H04L 1/1896 370/329 |

OTHER PUBLICATIONS

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757, pp. 1-24, Retrieved from the Internet: URL: http://www.3gpp.org/ftp/tsg%5Fran/WG1%5FRL1/TSGR1%5FAH/NR%.

* cited by examiner

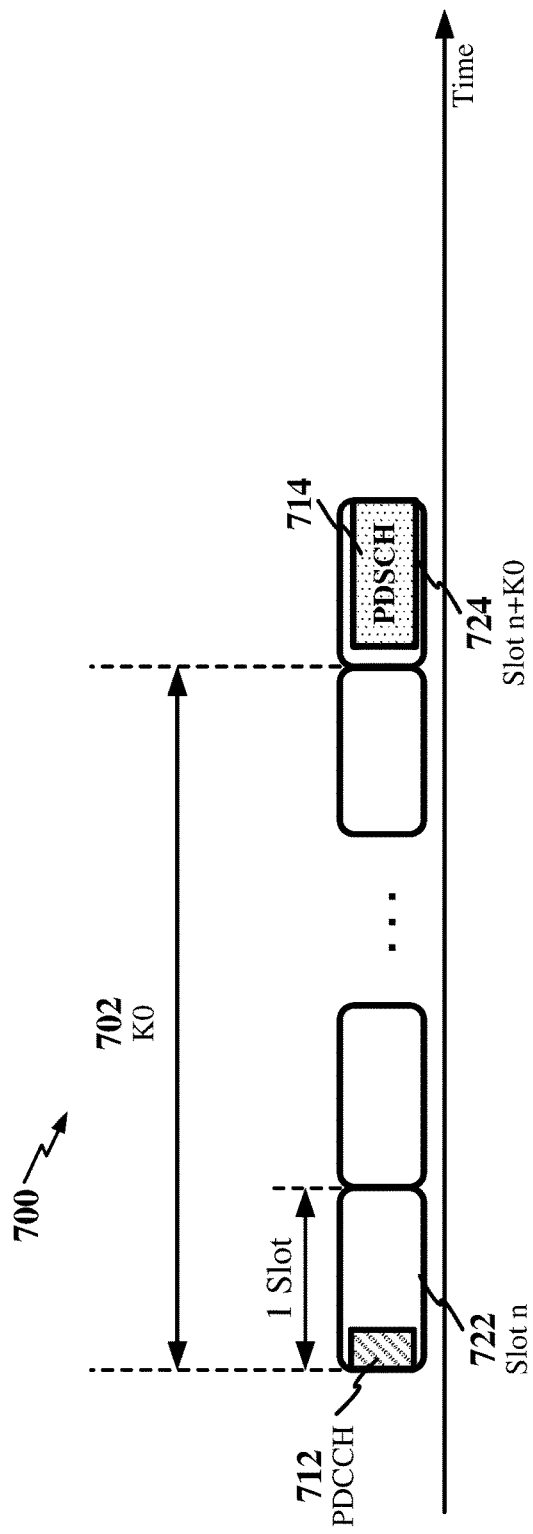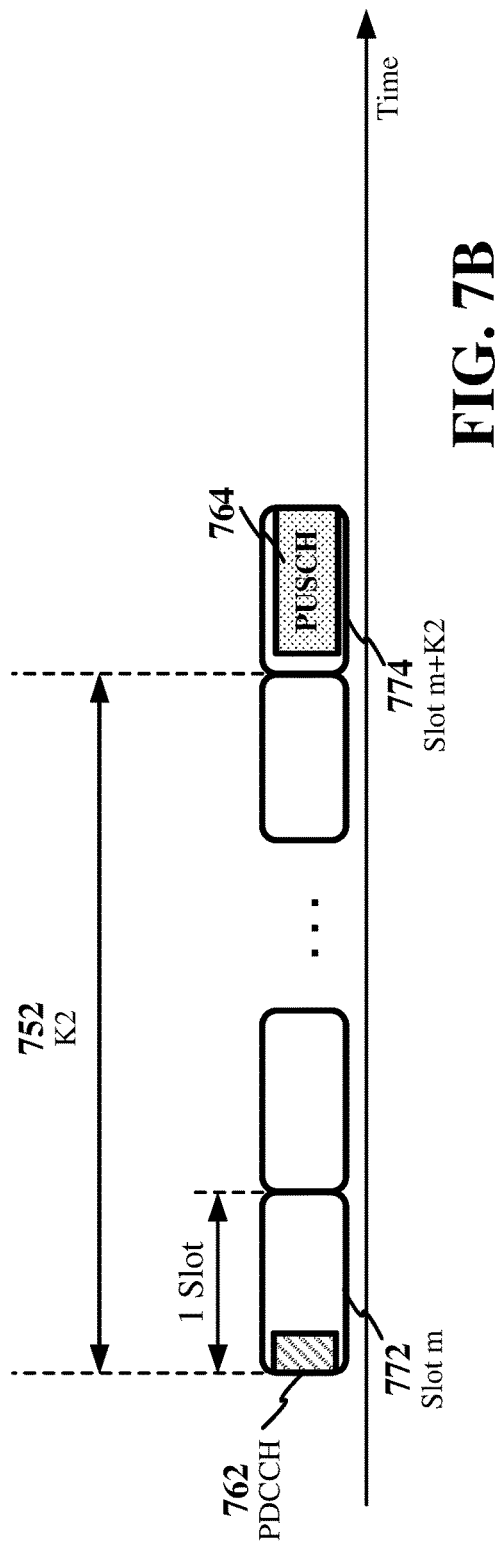
FIG. 7A
FIG. 7B

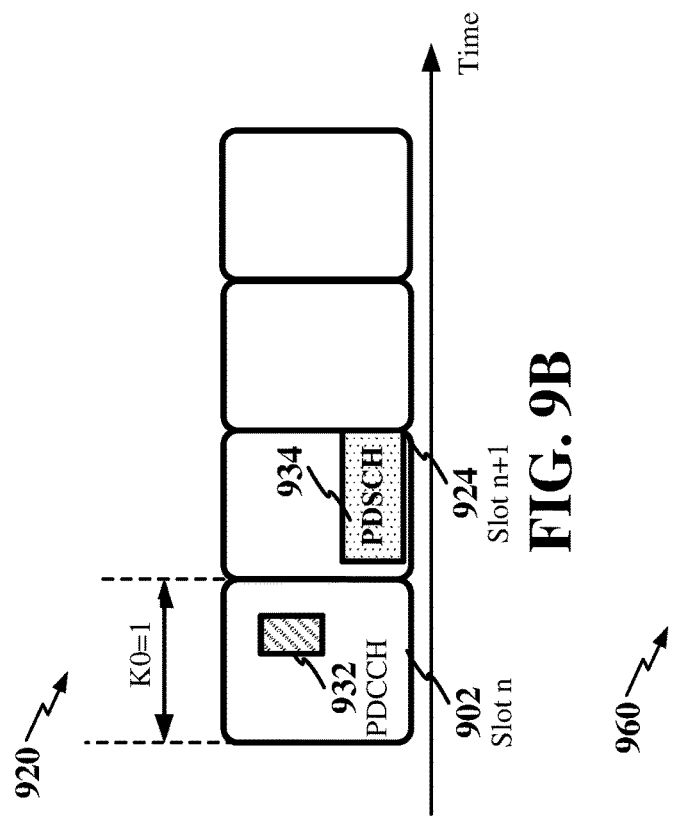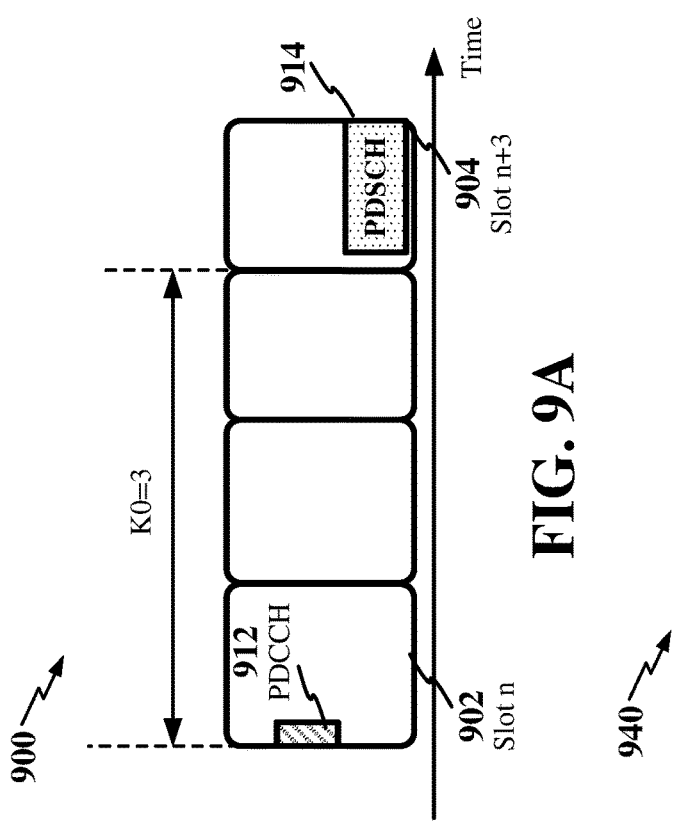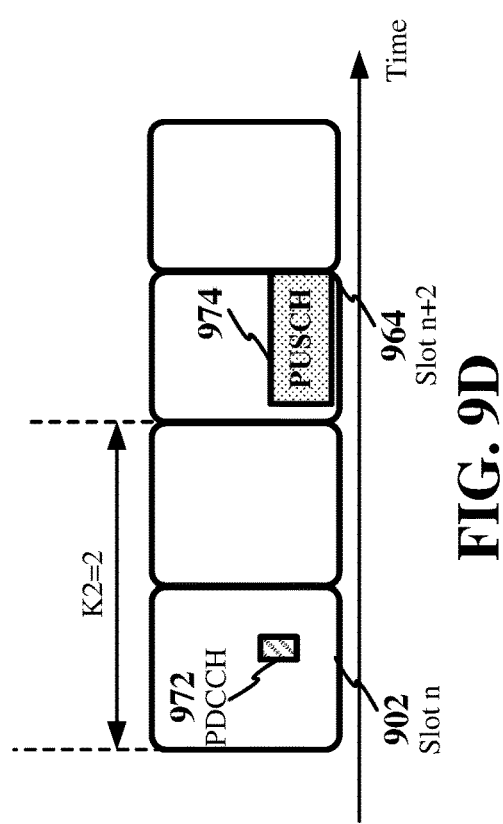

SEARCH SPACE SPECIFIC DELAY BETWEEN A DOWNLINK CONTROL CHANNEL AND CORRESPONDING DOWNLINK/UPLINK DATA

PRIORITY CLAIM

This application claims priority to and the benefit of provisional patent application No. 63/051,256 filed in the United States Patent & Trademark Office on Jul. 13, 2020, the entire content of which is incorporated herein by reference as if fully set forth below in its entirety and for all applicable purposes.

TECHNICAL FIELD

The technology discussed below relates generally to wireless communication systems, and more particularly, improvements in processing of a downlink control channel and scheduling of corresponding downlink data/uplink data.

INTRODUCTION

Control information conveyed by communication channels, such as a physical downlink control channel (PDCCH), is vital to proper allocation and decoding of data channels, such as a physical downlink shared channel (PDSCH) or a physical uplink shared channel (PUSCH). To access the control information (e.g., downlink control information (DCI)), a user equipment (UE) will first decode the PDCCH. For example, the UE may need to determine a location of the PDCCH, for example by identifying a control channel element (CCE) index value that identifies the starting position of the PDCCH. The UE may also need to determine an aggregation level, which relates to informing the UE of the number of CCEs used to make up the PDCCH. The UE may also need to determine if and how a base station interleaved the control and data portions of the DCI, as well as determining if the PDCCH candidate was even associated with the UE and an identifier of the UE, such as a cell-radio network temporary identifier (C-RNTI). A C-RNTI may be used for identifying RRC connection and scheduling, which is dedicated to a particular UE. A base station may assign different C-RNTI values to different UEs. The base station may use the C-RNTI to allocate a UE with uplink grants (e.g., for a PUSCH) and downlink assignments (e.g., for a PDSCH), for example. However, the only thing known to the UE is information about a certain range of CCEs referred to as search spaces that possibly carries the DCI on a PDCCH. Presently, these attempts may be based on trial and error and may be referred to generally as PDCCH blind decoding.

A time delay between a slot location of reception of a PDCCH and a scheduled downlink in a PDSCH or a scheduled uplink in a PUSCH may be configured by a base station. A longer time delay may provide advantages in that the UE may have longer time to decode and process the PDCCH. On the other hand, with the longer time delay, there is an increased delay communication of downlink data in the PDSCH or uplink data in the PUSCH. Hence, configuration of such a time delay may be improved.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to configuration of time delays between a resource location of a downlink control channel and a resource location of a corresponding downlink data/uplink data. The time delays may be configured per search space, instead of configuring the time delays per bandwidth part (BWP), where multiple search spaces are included per BWP. As such, flexibility in configuring the time delays is achieved.

In one example, a method of wireless communication by a base station is disclosed. The method includes determining a plurality of first search spaces indicating potential locations for a first downlink control channel or a plurality of second search spaces indicating potential locations for a second downlink control channel or both, configuring a plurality of first delays, or a plurality of second delays, or both, and transmitting the plurality of first delays or the plurality of second delays or both to a UE. Each first delay may indicate a respective time delay between a resource location of the first downlink control channel and a resource location of a downlink data associated with the first downlink control channel and is configured for a respective first search space of the plurality of first search spaces, and each second delay may indicate a respective time delay between a resource location of the second downlink control channel and a resource location of an uplink data associated with the second downlink control channel and is configured for a respective second search space of the plurality of second search spaces. In an aspect, the plurality of first delays may be transmitted via first downlink control information on the first downlink control channel, and/or the plurality of second delays may be transmitted via second downlink control information on the second downlink control channel.

In an aspect, each of the plurality of first search spaces may include at least one respective first control channel element (CCE), and each of the plurality of second search spaces includes at least one respective second CCE. In an aspect, the resource location of the first downlink control channel and the resource location of the downlink data may be a slot location of the first downlink control channel and a slot location of the downlink data, respectively, and the resource location of the second downlink control channel and the resource location of the uplink data may be a slot location of the second downlink control channel and a slot location of the uplink data, respectively.

In an aspect, the method may further include transmitting at least one of: the first downlink control channel in a first search space of the plurality of first search spaces that corresponds to the resource location of the first downlink control channel, or the second downlink control channel in a second search space of the plurality of second search spaces that corresponds to the resource location of the second downlink control channel. In an aspect, the method may further include transmitting the downlink data in the resource location of the downlink data based on a first delay of the plurality of first delays that is configured for the first search space. In an aspect, the method may further include receiving the uplink data in the resource location of the uplink data based on a second delay of the plurality of second delays that is configured for the second search space.

In an aspect, the method may further include at least one of: configuring and transmitting at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, or configuring and transmitting at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively. In an aspect, the at least one minimum first delay or the at least one minimum second delay or both may be transmitted via a radio resource control (RRC) message.

In an aspect, at least one periodicity respectively associated with the at least one first search space may be longer than one slot, and at least one periodicity respectively associated with the at least one second search space may be longer than one slot.

In an aspect, each of the at least one minimum first delay is configured based on a periodicity of a respective first search space of the at least one first search space, and each of the at least one minimum second delay is configured based on a periodicity of a respective second search space of the at least one second search space.

In an aspect, the at least one minimum first delay may cause at least one first downlink control channel detection limit for the first downlink control channel to be over multiple slots, and the at least one minimum second delay may cause at least one first downlink control channel detection limit for the second downlink control channel to be over multiple slots.

In an aspect, the downlink data is transmitted at the resource location of the downlink data based on the at least one minimum first delay when a frequency range of the first downlink control channel exceeds a frequency threshold and/or when a subcarrier spacing of the first downlink control channel exceeds a subcarrier spacing threshold, and the uplink data is received at the resource location of the uplink data based on the at least one minimum second delay when a frequency range of the second downlink control channel exceeds the frequency threshold and/or when a subcarrier spacing of the second downlink control channel exceeds the subcarrier spacing threshold. In another example, a method of wireless communication by a user equipment (UE) is disclosed. The method includes receiving information indicating a plurality of first search spaces, or a plurality of second search spaces, or both, wherein the plurality of first search spaces indicate potential locations for a first downlink control channel and the plurality of second search spaces indicate potential locations for a second downlink control channel, receiving a plurality of first delays, or a plurality of second delays, or both, where each first delay may indicate a respective time delay between a resource location of the first downlink control channel and a resource location of a downlink data associated with the first downlink control channel and is configured for a respective first search space of a plurality of first search spaces, and each second delay may indicate a respective time delay between a resource location of the second downlink control channel and a resource location of an uplink data associated with the second downlink control channel and is configured for a respective second search space of the plurality of second search spaces. The method further includes performing at least one of: detection for the first downlink control channel at the plurality of first search spaces respectively based on the plurality of first delays, or detection for the second downlink control channel at the plurality of second search spaces respectively based on the plurality of second delays. In an aspect, the plurality of first delays may be received via first downlink control information on the first downlink control channel, and/or the plurality of second delays may be received via second downlink control information on the second downlink control channel.

In an aspect, each of the plurality of first search spaces may include at least one respective first CCE, and each of the plurality of second search spaces includes at least one respective second CCE. In an aspect, the resource location of the first downlink control channel and the resource location of the downlink data may be a slot location of the first downlink control channel and a slot location of the downlink data, respectively, and the resource location of the second downlink control channel and the resource location of the uplink data may be a slot location of the second downlink control channel and a slot location of the uplink data, respectively.

In an aspect, the method may further include receiving at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel. In an aspect, the method may further include receiving the downlink data in the resource location of the downlink data based on a first delay of the plurality of first delays that is configured for the first search space. In an aspect, the method may further include transmitting the uplink data in the resource location of the uplink data based on the second delay of the plurality of second delays that is configured for the second search space.

In an aspect, the method may further include at least one of: receiving at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively, or receiving at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively. In an aspect, the at least one minimum first delay or the at least one minimum second delay or both may be received via an RRC message.

In an aspect, the method may further include at least one of receiving a minimum first delay between the resource location of the first downlink control channel and the resource location of the downlink data associated with the first downlink control channel, the minimum first delay being configured for a bandwidth part (BWP), wherein the detection for the first downlink control channel is performed at the at least one first search space based on the at least one minimum first delay while ignoring the minimum first delay configured for the BWP, or receiving a minimum second delay between the resource location of the second downlink control channel and the resource location of the uplink data associated with the second downlink control channel, the minimum second delay being configured for the BWP, wherein the detection for the second downlink control channel is performed at the at least one second search space based on the at least one minimum second delay while ignoring the minimum second delay configured for the BWP.

In an aspect, at least one periodicity respectively associated with the at least one first search space may be longer than one slot, and at least one periodicity respectively associated with the at least one second search space may be longer than one slot.

In an aspect, the method may further include at least one of: in response to receiving the at least one minimum first delay configured for the at least one first search space, determining at least one first downlink control channel detection limit for the first downlink control channel to be over multiple slots, wherein the detection for the first downlink control channel is performed at the at least one first search space further based on the first downlink control channel detection limit over a first plurality of slots, or in response to receiving the at least one minimum second delay configured for the at least one second search space, determining at least one second downlink control channel detection limit for the second downlink control channel to be over multiple slots, wherein the detection for the second downlink control channel is performed at the at least one second search space further based on the second downlink control channel detection limit over a second plurality of slots.

In an aspect, the method may further include determining a first downlink control channel detection limit for the first downlink control channel to be over a single slot if a corresponding one of the least one minimum first delay is less than or equal to a limit threshold, and determining the first downlink control channel detection limit for the first downlink control channel to be over multiple slots if a corresponding one of the least one minimum first delay exceeds the limit threshold.

In an aspect, the method may further include determining a second downlink control channel detection limit for the second downlink control channel to be over a single slot if a corresponding one of the least one minimum second delay is less than or equal to a limit threshold, and determining the second downlink control channel detection limit for the second downlink control channel to be over multiple slots if a corresponding one of the least one minimum second delay exceeds the limit threshold.

In an aspect, each of the at least one minimum first delay may be configured based on a periodicity of a respective first search space of the at least one first search space, and each of the at least one minimum second delay may be configured based on a periodicity of a respective second search space of the at least one second search space.

In an aspect, the downlink data may be received at the resource location of the downlink data based on the at least one minimum first delay when a frequency range of the first downlink control channel exceeds a frequency threshold and/or when a subcarrier spacing of the first downlink control channel exceeds a subcarrier spacing threshold, and the uplink data may be transmitted at the resource location of the uplink data based on the at least one minimum second delay when a frequency range of the second downlink control channel exceeds the frequency threshold and/or when a subcarrier spacing of the second downlink control channel exceeds the subcarrier spacing threshold.

In another example, a base station for wireless communication is disclosed. The base station includes at least one processor, a transceiver communicatively coupled to the at least one processor, and a memory communicatively coupled to the at least one processor. The at least one processor is configured to determine a plurality of first search spaces indicating potential locations for a first downlink control channel or a plurality of second search spaces indicating potential locations for a second downlink control channel or both, configure a plurality of first delays, or a plurality of second delays, or both, and transmit the plurality of first delays or the plurality of second delays or both to a UE. Each first delay may indicate a respective time delay between a resource location of the first downlink control channel and a resource location of a downlink data associated with the first downlink control channel and is configured for a respective first search space of the plurality of first search spaces, and each second delay may indicate a respective time delay between a resource location of the second downlink control channel and a resource location of an uplink data associated with the second downlink control channel and is configured for a respective second search space of the plurality of second search spaces.

In another example, a UE for wireless communication is disclosed. The base station includes at least one processor, a transceiver communicatively coupled to the at least one processor, and a memory communicatively coupled to the at least one processor. The at least one processor is configured to receive information indicating a plurality of first search spaces, or a plurality of second search spaces, or both, wherein the plurality of first search spaces indicate potential locations for a first downlink control channel and the plurality of second search spaces indicate potential locations for a second downlink control channel, and receive a plurality of first delays, or a plurality of second delays, or both, where each first delay may indicate a respective time delay between a resource location of the first downlink control channel and a resource location of a downlink data associated with the first downlink control channel and is configured for a respective first search space of a plurality of first search spaces, and each second delay may indicate a respective time delay between a resource location of the second downlink control channel and a resource location of an uplink data associated with the second downlink control channel and is configured for a respective second search space of the plurality of second search spaces. The at least one processor is further configured to perform at least one of: detection for the first downlink control channel at the plurality of first search spaces respectively based on the plurality of first delays, or detection for the second downlink control channel at the plurality of second search spaces respectively based on the plurality of second delays.

In another example, a non-transitory processor-readable storage medium having instructions thereon for a base station is disclosed. The instructions, when executed by a processing circuit, cause the processing circuit to determine a plurality of first search spaces indicating potential locations for a first downlink control channel or a plurality of second search spaces indicating potential locations for a second downlink control channel or both, configure a plurality of first delays, or a plurality of second delays, or both, and transmit the plurality of first delays or the plurality of second delays or both to a UE. Each first delay may indicate a respective time delay between a resource location of the first downlink control channel and a resource location of a downlink data associated with the first downlink control channel and is configured for a respective first search space of the plurality of first search spaces, and each second delay may indicate a respective time delay between a resource location of the second downlink control channel and a resource location of an uplink data associated with the second downlink control channel and is configured for a respective second search space of the plurality of second search spaces.

In another example, a non-transitory processor-readable storage medium having instructions thereon for a UE is disclosed. The instructions, when executed by a processing circuit, cause the processing circuit to receive information indicating a plurality of first search spaces, or a plurality of second search spaces, or both, wherein the plurality of first search spaces indicate potential locations for a first downlink control channel and the plurality of second search spaces indicate potential locations for a second downlink control channel, and receive a plurality of first delays, or a plurality of second delays, or both, where each first delay may indicate a respective time delay between a resource location of the first downlink control channel and a resource location of a downlink data associated with the first downlink control channel and is configured for a respective first search space of a plurality of first search spaces, and each second delay may indicate a respective time delay between a resource location of the second downlink control channel and a resource location of an uplink data associated with the second downlink control channel and is configured for a respective second search space of the plurality of second search spaces. The instructions further cause the processing circuit to perform at least one of: detection for the first downlink control channel at the plurality of first search spaces respectively based on the plurality of first delays, or detection for the second downlink control channel at the plurality of second search spaces respectively based on the plurality of second delays.

In another example, a base station for wireless communication is disclosed. The base station includes means for determining a plurality of first search spaces indicating potential locations for a first downlink control channel or a plurality of second search spaces indicating potential locations for a second downlink control channel or both, means for configuring a plurality of first delays, or a plurality of second delays, or both, and means for transmitting the plurality of first delays or the plurality of second delays or both to a UE. Each first delay may indicate a respective time delay between a resource location of the first downlink control channel and a resource location of a downlink data associated with the first downlink control channel and is configured for a respective first search space of the plurality of first search spaces, and each second delay may indicate a respective time delay between a resource location of the second downlink control channel and a resource location of an uplink data associated with the second downlink control channel and is configured for a respective second search space of the plurality of second search spaces.

In a further example, a UE for wireless communication is disclosed. The UE includes means for receiving information indicating a plurality of first search spaces, or a plurality of second search spaces, or both, wherein the plurality of first search spaces indicate potential locations for a first downlink control channel and the plurality of second search spaces indicate potential locations for a second downlink control channel, and means for receiving a plurality of first delays, or a plurality of second delays, or both, where each first delay may indicate a respective time delay between a resource location of the first downlink control channel and a resource location of a downlink data associated with the first downlink control channel and is configured for a respective first search space of a plurality of first search spaces, and each second delay may indicate a respective time delay between a resource location of the second downlink control channel and a resource location of an uplink data associated with the second downlink control channel and is configured for a respective second search space of the plurality of second search spaces. The UE further includes means for performing at least one of: detection for the first downlink control channel at the plurality of first search spaces respectively based on the plurality of first delays, or detection for the second downlink control channel at the plurality of second search spaces respectively based on the plurality of second delays.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 7A and 7B are example diagrams illustrating various time delays associated with downlink control channel processing according to some aspects of the disclosure.

FIGS. 9A-9D are example diagrams illustrating various delays between a slot location of a downlink control channel and a slot location of a corresponding downlink data/uplink data per search space.

DETAILED DESCRIPTION

Figure 1:
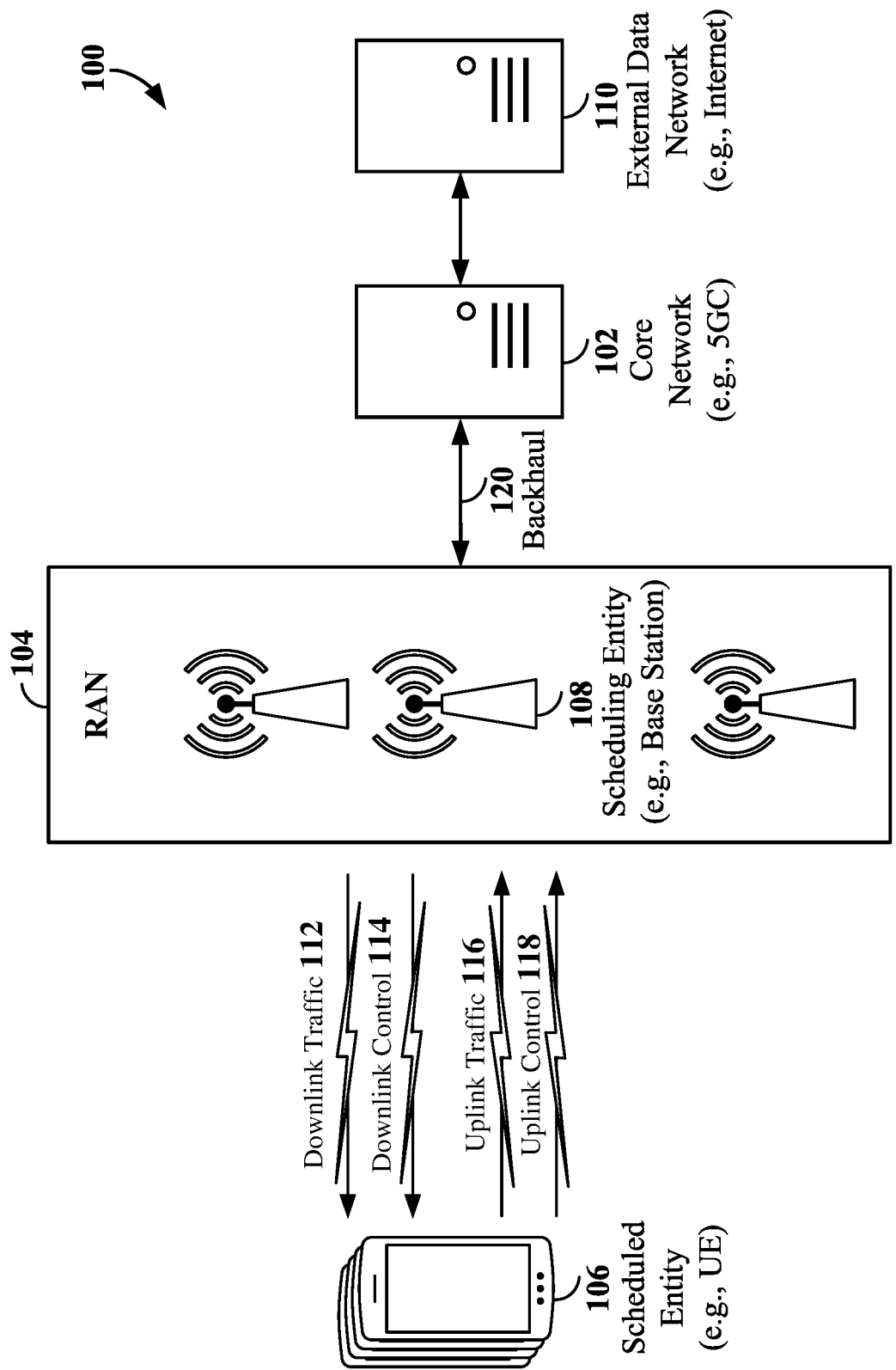
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). It is intended that innovations described herein may be practiced in a wide variety of devices, chip-level components, systems, distributed arrangements, end-user devices, etc. of varying sizes, shapes, and constitution.

Physical downlink control channels (PDCCHs) carry downlink control information (DCI) that is needed for proper assignment and decoding of data channels, such as a physical downlink shared channel (PDSCH) and a physical uplink shared channel (PUSCH). A base station may transmit a PDCCH to a user equipment (UE), such that the UE may decode the PDCCH and schedule a downlink data in a PDSCH or an uplink data in a PUSCH. The UE may decode the PDCCH by blind decoding attempts on search spaces configured by the base station. The base station may configure a time delay (e.g., K0) between a communication of the PDCCH and a scheduled downlink of a corresponding downlink data in a PDSCH, and/or a time delay (e.g., K2) between a communication of the PDCCH and a scheduled uplink of a corresponding downlink data in a PUSCH, per bandwidth part (BWP). The base station may configure a minimum time delay (e.g., K0min) between a communication of the PDCCH and a scheduled downlink of a corresponding downlink data in a PDSCH, and/or a minimum time delay (e.g., K2min) between a communication of the PDCCH and a scheduled uplink of a corresponding downlink data in a PUSCH, per BWP. Each BWP may include multiple search spaces where the PDCCH may possibly decoded. However, configuring such a time delay for the PDSCH or PUSCH per BWP may not be desirable, especially for higher frequencies and larger subcarrier spacings that cause less available time for decoding and processing a PDCCH. Hence, more flexibility in configuring a time delay may be advantageous.

According to some aspects of the disclosure, a time delay may be configured per search space, instead of configuring the time delay per BWP. For example, the base station may configure a time delay (e.g., K0) between a communication of the PDCCH and a scheduled downlink of a corresponding downlink data in a PDSCH, and/or a time delay (e.g., K2) between a communication of the PDCCH and a scheduled uplink of a corresponding downlink data in a PUSCH, per search space. In some examples, the base station may also configure a minimum time delay (e.g., K0min) between a communication of the PDCCH and a scheduled downlink of a corresponding downlink data in a PDSCH, and/or a minimum time delay (e.g., K2min) between a communication of the PDCCH and a scheduled uplink of a corresponding downlink data in a PUSCH, per search space. As such, by configuring a time delay per search space, a different time delay may be configured for a different search space, and thus different time delays may be configured for different search spaces within a BWP. On the other hand, configuring the time delay per BWP results configuring the same time delay for all search spaces within the BWP. Hence, configuring a time delay per search space provides more flexibility than configuring a time delay per BWP.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE 106. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, antenna array modules, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108. A UE 106 that may operate as an unscheduled and/or a scheduled entity may be referred to as a scheduled entity 106 herein.

Base stations, represented in both the singular and the plural by scheduling entity 108, are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106). Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114 (DCI), including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, scheduling entities, as graphically represented in the singular and plural by scheduling entity 108, may include a backhaul interface for communication with a backhaul portion 120 of the wireless communication system 100. The backhaul portion 120 may provide a link between a scheduling entity 108 and the core network 102. Further, in some examples, a backhaul network may provide interconnection between the respective base stations (each similar to scheduling entity 108). Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
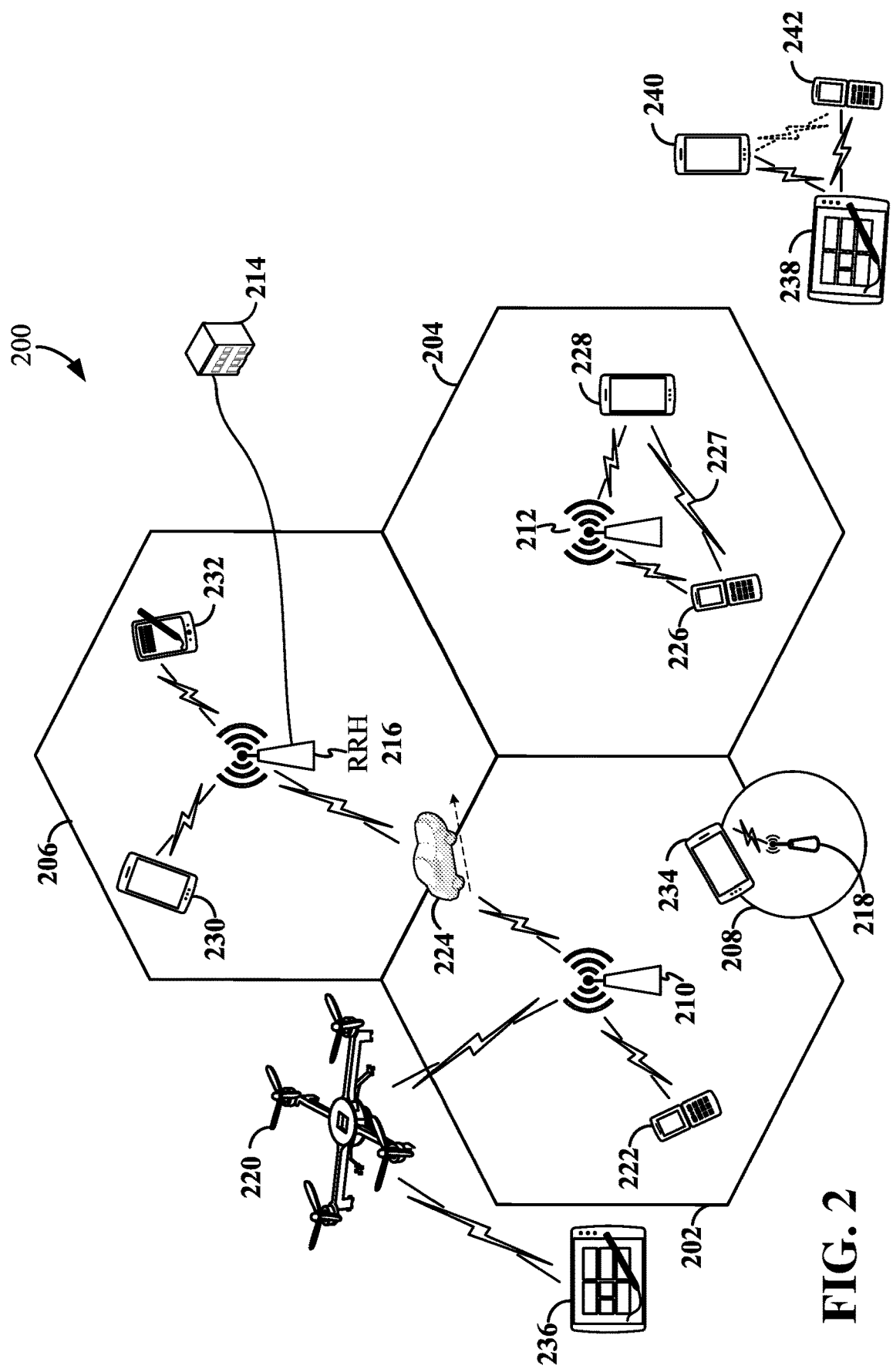
FIG. 2 is a schematic illustration of an example of a radio access network (RAN) according to some aspects of the disclosure.

FIG. 2 is a schematic illustration of an example of a radio access network (RAN) 200 according to some aspects of the disclosure. The RAN 200 may implement any suitable wireless communication technology or technologies to provide radio access to a UE, such as UE 222, 224, 226, 228, 230, 232, 234, 236. As one example, the RAN 200 may operate according to 3GPP NR specifications, often referred to as 5G. As another example, the RAN 200 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH 216 by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as a quadcopter or drone 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1.

In some examples, a mobile network node (e.g., an unmanned aerial vehicle (UAV) such as a quadcopter or drone 220) may be configured to function as a UE. For example, the quadcopter or drone 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In some examples, the sidelink signals 227 include sidelink traffic and sidelink control. In a further example, UE 238 is illustrated communicating with UEs 240 and 242. Here, the UE 238 may function as a scheduling entity or a primary/transmitting sidelink device, and UEs 240 and 242 may function as a scheduled entity or a non-primary (e.g., secondary/receiving) sidelink device. For example, a UE may function as a scheduling entity or a scheduled entity in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with the UE 238 functioning as the scheduling entity. Thus, in a wireless communication system with scheduled access to time-frequency resources and having a cellular configuration, a P2P/D2D configuration, or a mesh configuration, a scheduling entity and one or more scheduled entities may communicate utilizing the scheduled resources.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 200, the ability for a UE to communicate while moving, independent of its location, is referred to as mobility. The various physical channels between the UE and the RAN 200 are generally set up, maintained, and released under the control of an access and mobility management function (AMF), which may include a security context management function (SCMF) that manages the security context for both the control plane and the user plane functionality and a security anchor function (SEAF) that performs authentication.

In various aspects of the disclosure, a RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the network may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
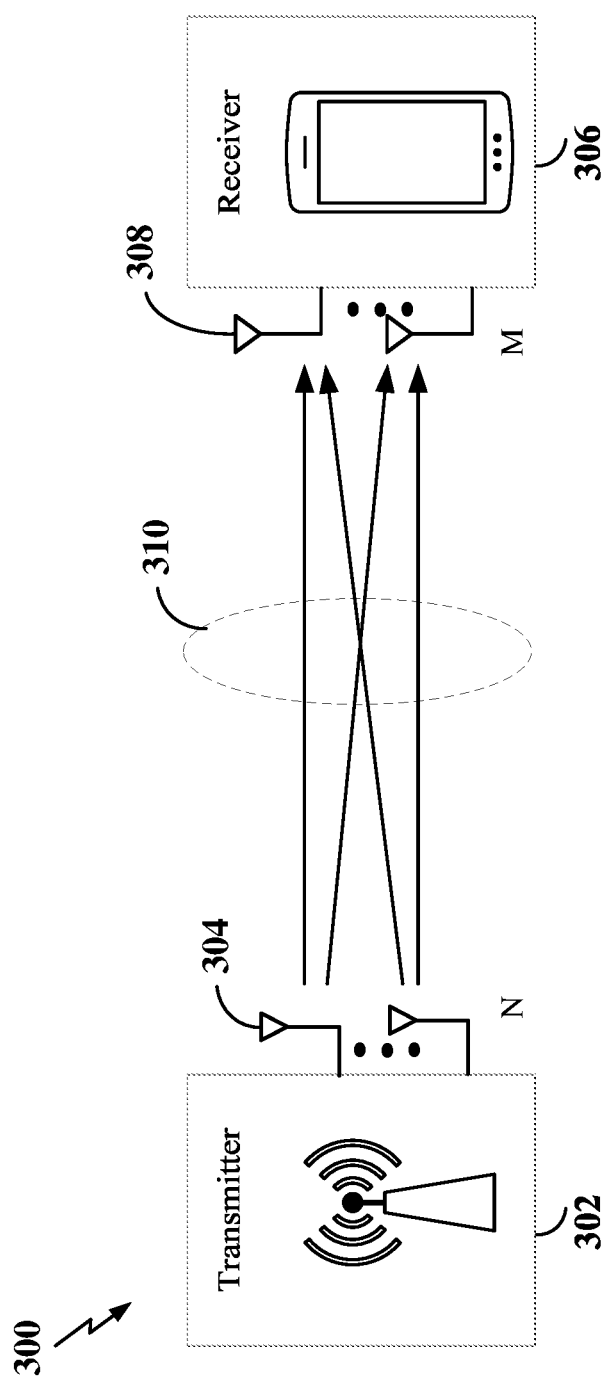
FIG. 3 is a block diagram illustrating a wireless communication system supporting multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 3 illustrates an example of a wireless communication system 300 supporting beamforming and/or MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. The multiple transmit antennas 304 and multiple receive antennas 308 may each be configured in a single panel or multi-panel antenna array. Each of the transmitter 302 and the receiver 306 may be implemented, for example, within a base station/scheduling entity 108, as illustrated in FIGS. 1 and/or 2, a UE/scheduled entity 106, as illustrated in FIGS. 1 and/or 2, or any other suitable wireless communication device.

The use of such multiple antenna technology enables the wireless communication system 300 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 300 supporting MIMO) is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 3, a rank-2 spatial multiplexing transmission on a 2×2 MIMO antenna configuration will transmit one data stream from each of the transmit antennas 304. Each data stream reaches each of the receive antennas 308 along a different one of the signal paths 310. The receiver 306 may then reconstruct the data streams using the received signals from each of the receive antennas 308.

Beamforming is a signal processing technique that may be used at the transmitter 302 or receiver 306 to shape or steer an antenna beam (e.g., a transmit/receive beam) along a spatial path between the transmitter 302 and the receiver 306. Beamforming may be achieved by combining the signals communicated via antennas 304 or 308 (e.g., antenna elements of an antenna array) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In some examples, to select one or more serving beams for communication with a UE, the base station may transmit a reference signal, such as a synchronization signal block (SSB), a tracking reference signal (TRS), or a channel state information reference signal (CSI-RS), on each of a plurality of beams in a beam-sweeping manner. The UE may measure the reference signal received power (RSRP) on each of the beams and transmit a beam measurement report to the base station indicating the Layer 1 (L-1 RSRP) of each of the measured beams. The base station may then select the serving beam(s) for communication with the UE based on the beam measurement report. In other examples, when the channel is reciprocal, the base station may derive the particular beam(s) to communicate with the UE based on uplink measurements of one or more uplink reference signals, such as a sounding reference signal (SRS).

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub 6 GHz systems.

Beamforming may be used in both half duplex and full duplex wireless communication networks. In full duplex networks, downlink and uplink transmissions may occur simultaneously. In some examples, full duplex networks may utilize sub-band FDD in unpaired spectrum, in which transmissions in different directions are carried in different sub-bands or BWPs of the carrier bandwidth.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms.

Within the present disclosure, a frame 400 refers to a duration of 10 ms for wireless transmissions, with each frame 400 consisting of 10 subframes of 1 ms each. A transmission burst may include multiple frames. On a given carrier, there may be one set of frames in the UL, and another set of frames in the DL. Referring now to FIG. 4, an expanded view of an OFDM resource grid 402 including an exemplary first subframe 407 is illustrated. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers or tones.

The resource grid 402 may be used to schematically represent time-frequency resources for a given antenna port. That is, in a multiple-input-multiple-output (MIMO) implementation with multiple antenna ports available, a corresponding multiple number of resource grids 402 may be available for communication. The resource grid 402 is divided into multiple resource elements (REs) 404. An RE 404, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 406, which contains any suitable number of consecutive subcarriers in the frequency domain. In one example, the RB 406 may include 12 subcarriers, a number independent of the numerology used. In some examples, depending on the numerology, an RB may include any suitable number of consecutive OFDM symbols in the time domain. Within the present disclosure, it is assumed that a single RB such as the RB 406 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 404 within one or more sub-bands or bandwidth parts (BWPs). Thus, a UE generally utilizes only a subset of the resource grid 402. An RB may be the smallest unit of resources that can be allocated to a UE. Thus, the more RBs scheduled for a UE, and the higher the modulation scheme chosen for the air interface, the higher the data rate for the UE.

In this illustration, the RB 406 is shown as occupying less than the entire bandwidth of the first subframe 407, with some subcarriers illustrated above and below the RB 406. In a given implementation, the first subframe 407 may have a bandwidth corresponding to any number of one or more RBs 406. Further, in this illustration, the RB 406 is shown as occupying less than the entire duration of the first subframe 407, although this is merely one possible example.

Each of the first subframe 407 and a second subframe 408 (e.g., where each subframe has a 1 ms duration) may consist of one or multiple adjacent slots. In the illustrative example shown in FIG. 4, the first subframe 407 includes one slot and the second subframe 408 includes four slots. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened TTIs may in some cases be transmitted occupying resources scheduled for ongoing slot transmissions for the same or for different UEs. Any number of resource blocks may be utilized within a subframe or slot.

An expanded view of one of the slots 410 illustrates the slot 410 as including a control region 412 and a data region 414. In a first downlink example of the slot 410, the control region 412 may carry control channels (e.g., a physical downlink control channel (PDCCH)) and the data region 414 may carry data channels (e.g., a physical downlink shared channel (PDSCH)). In a second uplink example of the slot 410, the relative positions of the control region 412 and the data region 414 may be reversed and the control region 412 may carry control channels (e.g., a physical uplink control channel (PUCCH)) and the data region 414 may carry data channels (e.g., a physical uplink shared channel (PUSCH)). Of course, a slot may contain all DL, all UL, or at least one DL portion and at least one UL portion. The structures illustrated in FIG. 4 are merely exemplary in nature, and different slot structures may be utilized, and may include one or more of each of the control region(s) and data region(s).

Figure 4:
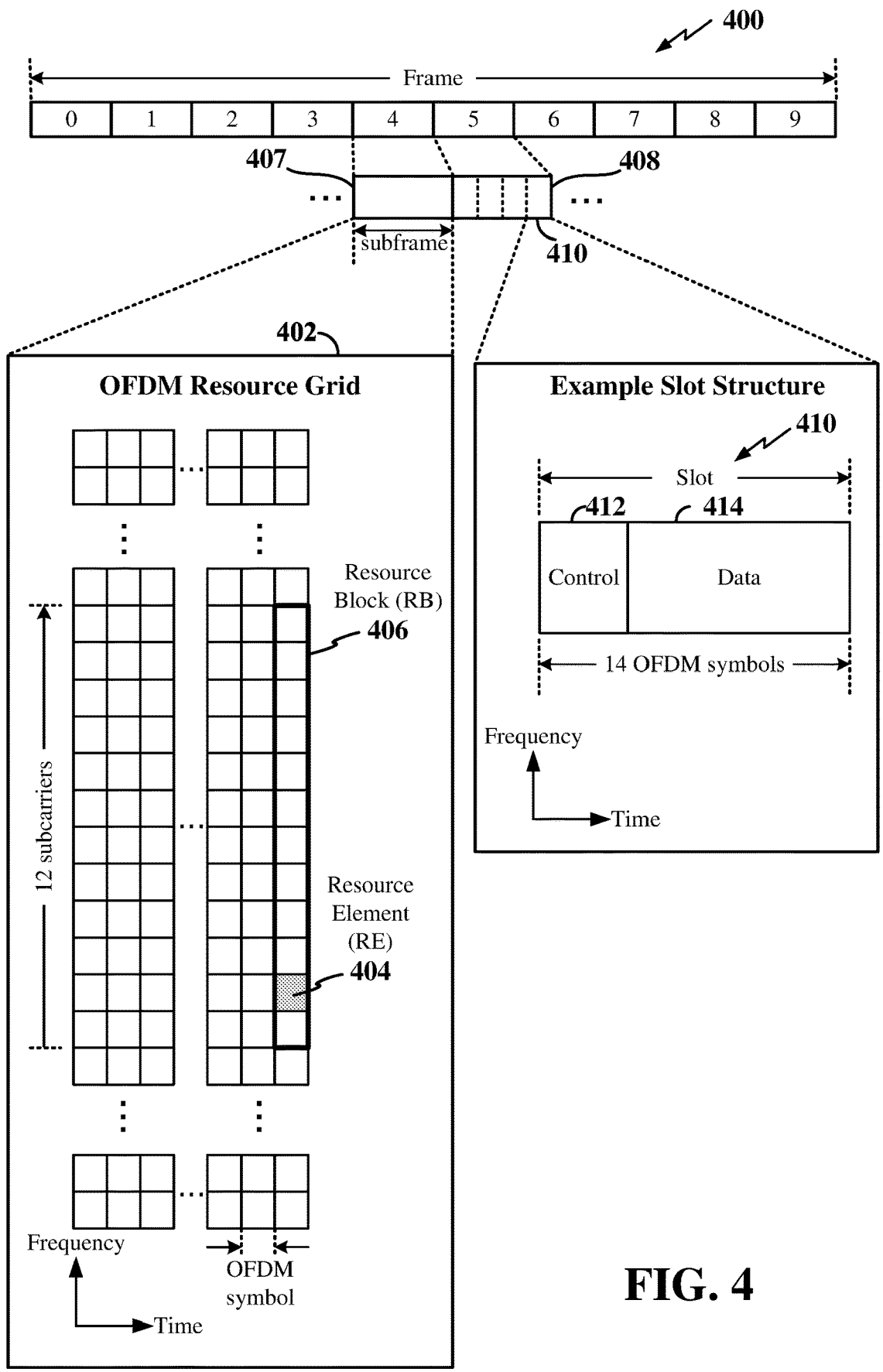
FIG. 4 is a schematic illustration of an organization of wireless resources in an air interface utilizing orthogonal frequency divisional multiplexing (OFDM) according to some aspects of the disclosure.

Although not illustrated in FIG. 4, the various REs 404 within an RB 406 may be scheduled to carry one or more physical channels, including control channels, shared channels, data channels, etc. Other REs 404 within the RB 406 may also carry pilots or reference signals, including but not limited to a demodulation reference signal (DMRS), a control reference signal (CRS), channel state information reference signal (CSI-RS), and/or a sounding reference signal (SRS). These pilots or reference signals may provide for a receiving device to perform channel estimation of the corresponding channel, which may enable coherent demodulation/detection of the control and/or data channels within the RB 406.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. As used herein, a broadcast communication is delivered to all devices, whereas a multicast communication is delivered to multiple intended recipient devices. A unicast communication may refer to a point-to-point transmission by a one device to a single other device.

In a DL transmission, a transmitting device (e.g., the base station/scheduling entity 108) may allocate one or more REs 404 (e.g., DL REs within the control region 412) to carry DL control information (DCI) including one or more DL control channels that may carry information, for example, originating from higher layers, such as a physical broadcast channel (PBCH), a physical hybrid automatic repeat request (HARQ) indicator channel (PHICH), a physical downlink control channel (PDCCH), etc., to one or more scheduled entities (e.g., UE/scheduled entity 106). A Physical Control Format Indicator Channel (PCFICH) may provide information to assist a receiving device in receiving and decoding the PDCCH and/or Physical HARQ Indicator Channel (PHICH). The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. The PDCCH may carry downlink traffic 112, including downlink control information (DCI) for one or more UEs in a cell. This may include, but not limited to, power control commands, scheduling information, a grant, and/or an assignment of REs for DL and UL transmissions.

The base station may further allocate one or more REs 404 to carry other DL signals, such as a demodulation reference signal (DMRS); a phase-tracking reference signal (PT-RS); a positioning reference signal (PRS), a channel-stated information reference signal (CSI-RS); a primary synchronization signal (PSS); and a secondary synchronization signal (SSS). These DL signals, which may also be referred to as downlink physical signals, may correspond to sets of resource elements used by the physical layer but they generally do not carry information originating from higher layers. A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

The synchronization signals PSS and SSS (collectively referred to as a synchronization signal or SS), and in some examples, the PBCH, may be transmitted in an SS block that may include 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

In an UL transmission, a transmitting device (e.g., a UE/scheduled entity 106) may utilize one or more REs 404, including one or more UL control channels that may carry uplink control information (UCI) to the base station/scheduling entity 108, for example. UCI may include a variety of packet types and categories, including pilots, reference signals, and information configured to enable or assist in decoding uplink data transmissions. In some examples, the uplink control information may include a scheduling request (SR), i.e., request for the scheduling entity to schedule uplink transmissions. Here, in response to the SR transmitted on the uplink control channel from the scheduled entity 106, the scheduling entity 108 may transmit downlink control information (DCI) that may schedule resources for uplink packet transmissions. UCI may also include HARQ feedback, such as an acknowledgment (ACK) or negative acknowledgment (NACK), channel state information (CSI), channel state feedback (CSF), or any other suitable UL control information (UCI). The UCI may originate from higher layers via one or more UL control channels, such as a physical uplink control channel (PUCCH), a physical random access channel (PRACH), etc. Further, UL REs 404 may carry UL physical signals that generally do not carry information originating from higher layers, such as demodulation reference signals (DMRS), phase-tracking reference signals (PT-RS), sounding reference signals (SRS), etc.

In addition to control information, one or more REs 404 (e.g., within the data region 414) may be allocated for user data traffic. Such traffic may be carried on one or more traffic channels, such as, for a DL transmission, a physical downlink shared channel (PDSCH), or for an UL transmission, a physical uplink shared channel (PUSCH). In some examples, one or more REs 404 within the data region 414 may be configured to carry SIBs (e.g., SIB1), carrying information that may enable access to a given cell.

The physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

Figure 5:
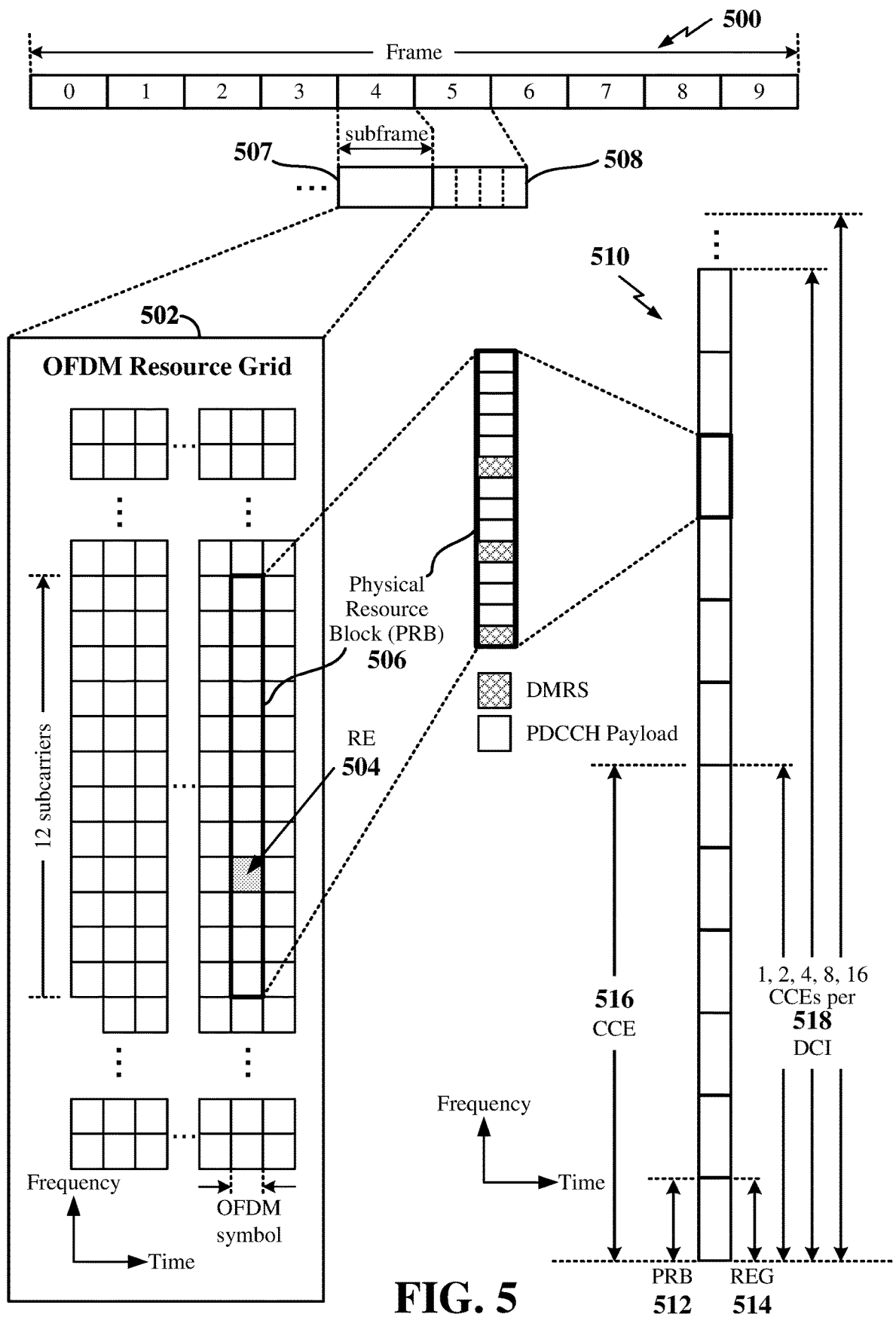
FIG. 5 is another schematic illustration of an organization of wireless resources in an air interface utilizing OFDM and illustrating location of physical resource blocks within CCEs and DCIs according to some aspects of the disclosure.

FIG. 5 is another schematic illustration of an organization of wireless resources in an air interface utilizing OFDM and exemplifying a location of a plurality of physical resource blocks (PRBs) within CCEs and DCIs according to some aspects of the disclosure. In FIG. 5, time is in the horizontal direction with units of OFDM symbols; and frequency is in the vertical direction with units of subcarriers or tones. As with FIG. 4, a frame 500 refers to a duration of 10 ms, with each frame 400 consisting of 10 subframes of 1 ms each. An expanded view of an OFDM resource grid 502 depicts an exemplary first subframe 507 with one slot and an exemplary second subframe 508 with four slots.

As with FIG. 4, the resource grid 502 may be used to schematically represent time-frequency resources for a given antenna port. That is, in a multiple-input-multiple-output (MIMO) implementation with multiple antenna ports available, a corresponding multiple number of resource grids 502 may be available for communication. The resource grid 502 is divided into multiple resource elements (REs) 504. An RE 504, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In the example of FIG. 5, a block of REs may be referred to as a physical resource block (PRB) 506, which contains any suitable number of consecutive subcarriers in the frequency domain. In one example, the PRB 506 may include 12 subcarriers, a number independent of the numerology used. In some examples, depending on the numerology, an PRB may include any suitable number of consecutive OFDM symbols in the time domain. Within the present disclosure, it is assumed that a single PRB such as the PRB 506 entirely corresponds to a single direction of communication (either transmission or reception for a given device).

In the illustrative example shown in FIG. 5, the first subframe 507 includes one slot and the second subframe 508 includes four slots. In FIG. 5, one PRB 506 representing one OFDM symbol of a physical downlink control channel (PDCCH) is depicted in greater detail than other illustrated PRBs for purposes of explanation. The PRB 506 is comprised of 12 subcarriers and one OFDM symbol. Of the 12 subcarriers, 3 are used for demodulation reference signals (DMRSs) and 9 are used for PDCCH payload. The REs 504 carrying the DMRS are the first, fifth, and ninth REs 504 of the PRB 506.

A plurality of PRBs 510, spanning a greater (e.g., wider) bandwidth than PRB 506 alone, are depicted in FIG. 5. For example, the plurality of PRBs 510 includes PRB 506 and PRB 512. One PRB, such as PRB 512, may be referred to as a resource element group (REG). As illustrated for exemplary PRB 512 corresponds to REG 514.

According to some aspects, a control channel entity (CCE) 516 may include 6 REGs. A CCE 516 may be a smallest unit of a scheduled PDCCH transmission. According to some examples, a collection of 1, 2, 4, 8, or 16 CCEs (such as CCE 516) (where the number may be referred to as the aggregation level) may be referred to as downlink control information (DCI) 518. The CCE may be the unit upon which search spaces for blind decoding of PDCCH candidates is defined. In the example of FIG. 5, the DCI 518 may carry control information used to schedule a user data channel (e.g., the PDSCH) on the downlink, for example. In the example of FIG. 5, the DCI 518 may be carried by the PDCCH.

Figure 6:
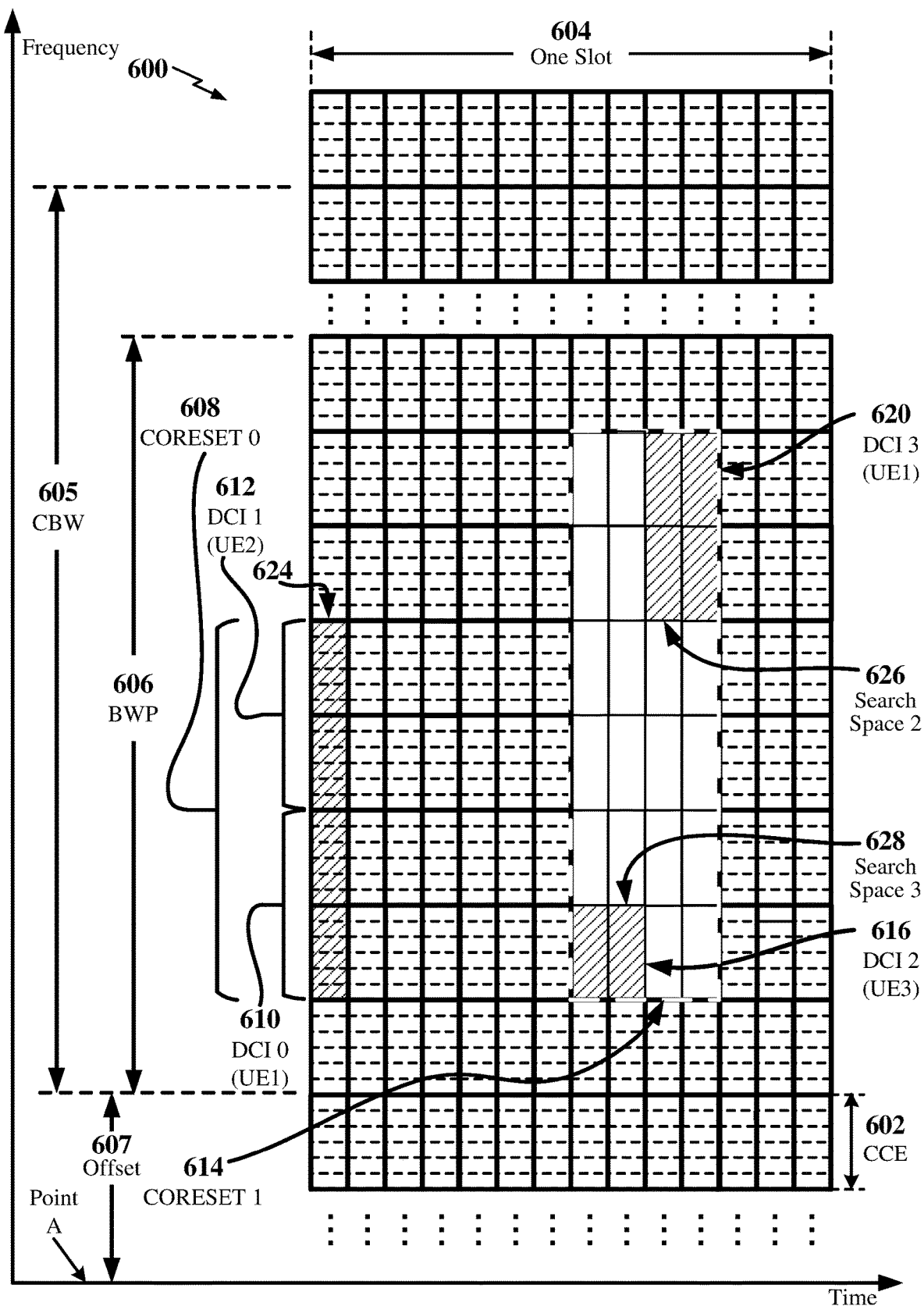
FIG. 6 is another schematic illustration of an organization of wireless resources in an air interface utilizing OFDM according to some aspects of the disclosure.

FIG. 6 is another schematic illustration of an organization of wireless resources in an air interface utilizing OFDM according to some aspects of the disclosure. In FIG. 6, time is in the horizontal direction with units of OFDM symbols; and frequency is in the vertical direction with units of CCEs. For example, the vertical dimension of each major solid line rectangle represents one CCE 602. Each CCE 602 includes 6 resource element groups (REGs). Each REG includes one physical resource block (PRB) of 12 subcarriers by one OFDM symbol. The 6 REGs are each represented by a minor dished line rectangle. One slot 604 in the time domain is represented. The time-frequency resources of FIG. 6 are depicted in a downlink resource grid 600.

FIG. 6 depicts one bandwidth part (BWP) 606 within a carrier bandwidth (CBW) 605. According to some aspects, a BWP 606 is a contiguous set of physical resource blocks (PRBs) on a given carrier. In FIG. 6, the contiguous set of PRBs are represented by a contiguous set of CCEs 602. The BWP 606 may be offset 607 in frequency from a common reference point for all resource grids in the frequency domain referred to as "Point A" and illustrated in FIG. 6. Point A may be a center of a subcarrier 0 of a common resource block 0 of a lowest resource grid. Point A may be outside of a carrier BW assigned to or used by a particular device. In the example of FIG. 6, the BWP 606 corresponds to a set of 48 PRBs, which represent 576 subcarriers (i.e., 12 REs/REG×6 REGs/DCI×8 DCI). A scheduling entity (e.g., a base station) can define common CCEs and scheduled entity-specific (e.g., UE-specific) CCEs.

In FIG. 6, for example, CORESET 0 608 includes 24 REGs (corresponding to 24 PRBs) in one set of four CCEs (where each CCE may be similar to CCE 602), configured as four CCEs in the frequency domain and one OFDM symbol in the time domain. The four CCE may be grouped as a first DCI (DCI 0 610) and a second DCI (DCI 1 612). There are two CCEs in DCI 0 610 and two CCEs in DCI 1 612. Within CORESET 0 608, DCI 0 610 may be associated with a first scheduled entity (e.g. a first UE, UE1) and DCI 1 612 may be associated with a second scheduled entity (e.g. a second UE, UE2).

In another example, CORESET 1 614 includes two CCEs, grouped as a third DCI (DCI 2 616) and four DCIs grouped as a fourth DCI (DCI 3 620). DCI 2 616 may be configured as one CCE in the frequency domain and 2 OFDM symbols in the time domain. DCI 2 616 may be associated with a third scheduled entity (e.g. a third UE, UE3). DCI 3 620 may be configured as two CCEs in the frequency domain and 2 OFDM symbols in the time domain. DCI 3 620 may be associated with the first scheduled entity (e.g. the first UE, UE1).

Three search spaces are identified in the downlink resource grid 600. A first search space 624 may be in CORESET 0 608 and may be coincident with outline of DCI 0 610 and DCI 1 612. A second search space 626 and a third search space 628 may be in CORESET 1 614. The second search space 626 may be coincident with the outline of DCI 3 620. The third search space 628 may be coincident with the outline of DCI 2 616.

A search space may include a number of PDCCH candidates. There may be a mapping between a CORESET and a search space. For example, a CORESET may include a plurality of search spaces. In general, the scheduled entity may attempt to blind decode a PDCCH candidate in each search space; even if a scheduling entity did not schedule a PDCCH in any given search space. A CORESET may be associate with a common search space, a scheduled entity-specific search space, or a combination of both.

The following relationships between CORESETs, BWPs, and search spaces are made with reference to NR; however, the following is exemplary and non-limiting and other relationships between CORESETs, BWPs, and search spaces (or their equivalents, for example in other radio technologies) are within the scope of the disclosure. In general, there may be up to three CORESETs per BWP, including both common and scheduled entity-specific CORESETs. There may be up to four BWPs per serving cell, with only one of the BWPs active at a given time. Accordingly, a maximum number of CORESETs per serving cell may be twelve (e.g., 3 CORESETs per BWP×4 BWPs per serving cell). The resource elements of a CORESET may be mapped to one or more CCEs. One or more CCEs from one CORESET may be aggregated to form the resources used by one PDCCH. Blind decoding of PDCCH candidates is based on search spaces. A maximum number of search spaces per BWP may be ten. Multiple search spaces may use the time-frequency resources of one CORESET.

According to one example, a scheduling entity may compute a cyclic redundancy check (CRC) of a payload of a DCI carried by a PDCCH. The CRC may be scrambled using an identifier of a scheduled entity (e.g., using a C-RNTI). Upon receipt of the DCI, the scheduled entity may compute a scrambled CRC on the payload of the DCI using the same procedure as used by the scheduling entity. The scheduled entity may then compare the scrambled CRC to the received CRC. If the CRCs are equal, the DCI was meant for the scheduled entity. If the payload was corrupted or the CRC was scrambled using another scheduled entity's identification, then the CRCs would not match and the scheduled entity may disregard the DCI.

Limits on a total number of PDCCH blind decodes and a total number of control channel elements (CCEs) corresponding to PDCCH candidates may be defined per slot. In the example illustrated in FIG. 6, the limit on the total number of PDCCH blind decodes may be 3 as the number of search spaces where the PDCCH candidates are present is 3, and the limit on the total number of CCEs corresponding to PDCCH candidates is 10. A higher limit on the PDCCH blind decodes per slot is generally beneficial to provide more flexibility for a base station to schedule the PDCCH. If a higher frequency and/or a large subcarrier spacing is used for communicating a PDCCH, a less time is available for decoding and processing the PDCCH, which may cause the limits on the PDCCH blind decodes to become lower. In other words, with the less time available for decoding and processing the PDCCH, a total number of possible PDCCH blind decoding attempts may become smaller. As the limits on the PDCCH blind decodes become lower, flexibility for a base station to schedule the PDCCH may be reduced. Further, as the limits on the PDCCH blind decodes become lower, a blocking probability associated with the PDCCH may increase, where the blocking probability indicates the probability of UEs that cannot be scheduled for receiving DCI via the PDCCH.

Depending on the configuration of search spaces and periodicities of the search spaces, and/or time offsets, the number of PDCCH candidates may vary from one slot to another. For example, one slot may have a larger number of PDCCH candidates than another slot. Less time available for processing the PDCCH (e.g., due to a higher frequency and/or a large subcarrier spacing) may force the number of PDCCH candidates per slot to be smaller, which may cause the number of search spaces to decrease and/or may cause strict limits on designing of the search spaces.

The PDCCH decoding and processing may be performed over multiple slots if a configuration for the UE allows a delay in PDCCH decoding and processing. In an aspect, time delay parameters such as K0 and K2 may be introduced to indicate a delay in PDCCH decoding and processing. In particular, K0 indicates a delay between reception of DCI (e.g., for downlink scheduling) in a PDCCH and scheduled reception of a corresponding downlink data in a PDSCH, in a number of slots. K2 indicates a delay between reception of DCI (e.g., for uplink scheduling) in a PDCCH and scheduled transmission of a corresponding uplink data in a PUSCH, in a number of slots. Generally, different types of DCI are used for a PDSCH and a PUSCH, respectively. For example, the DCI format 0 may be used for uplink scheduling of the uplink data in the PUSCH, and the DCI format 1 may be used for downlink scheduling of the downlink data in the PDSCH.

FIGS. 7A and 7B are example diagrams illustrating various time delays associated with PDCCH processing according to some aspects of the disclosure. FIG. 7A is an example diagram 700 illustrating a delay K0 between a slot location of a PDCCH and a slot location of a PDSCH. In FIG. 7A, the delay K0 702 indicates a time delay between a slot location of a PDCCH 712 and a slot location of a PDSCH 714, in a number of slots. DCI in the PDCCH 712 is received in slot n 722, where n is a slot number and is an integer that is 0 or greater than 0. Because the time delay between the slot location of a PDCCH 712 and the slot location of a PDSCH 714 is K0, the downlink data in the PDSCH 714 is scheduled to be received in slot n+K0 724. Thus, if K0 is zero, the PDCCH is processed and a downlink data in the PDSCH is received within the same slot (e.g., slot n 722). On the other hand, if K0 is greater than zero, a downlink data in the PDSCH is received in a later slot than a slot (e.g., slot n 722) where the PDCCH is received. In FIG. 7B, the delay K2 752 indicates a time delay between a slot location of a PDCCH 762 and a slot location of a PUSCH 764, in a number of slots. DCI in the PDCCH 762 is received in slot m 772, where m is a slot number and is an integer that is 0 or greater than 0. Because the time delay between the slot location of a PDCCH 762 and the slot location of a PUSCH 764 is K2, the uplink data in the PUSCH 764 is scheduled to be transmitted in slot m+K2 774. Thus, if K2 is zero, the PDCCH is processed and an uplink data in the PUSCH is transmitted within the same slot (e.g., slot m 772). On the other hand, if K2 is greater than zero, an uplink data in the PDSCH is transmitted in a later slot than a slot (e.g., slot m 772) where the PDCCH is received.

A base station may configure K0 and K2 values and convey the K0 and K2 values to a UE. The base station may also configure K0min and K2min values and may convey the K0min and K2min values to a UE, where K0min indicates a minimum delay between a slot location of a PDCCH and a slot location of a corresponding PDSCH, and K2min indicates a minimum delay between a slot location of a PDCCH and a slot location of a corresponding PUSCH. If K0min and K2min allow sufficient delays, the complexity of PDCCH blind decoding by the UE may be distributed over multiple slots. For example, if K0min is greater than 0, the blind decoding of a PDCCH may be distributed over multiple slots, prior to reception of a downlink data in a corresponding PDSCH. Similarly, if K2min is greater than 0, the blind decoding of a PDCCH may be distributed over multiple slots, prior to transmission of an uplink data in a corresponding PUSCH.

K0 and K2 values and/or K0min and K2min values may be configured per BWP. As discussed above, multiple search spaces may exist per BWP. If K0min and K2min values are configured for a particular BWP, all of the search spaces within the particular BWP may be associated with the same K0min and K2min values. Hence, considering that multiple search spaces may exist per BWP, assigning the same K0 and K0 values and/or the same K0min and K2min values for all search spaces within the same BWP may be a restrictive approach that does not allow flexibility in configurations of the K0 and K2 values and/or K0min and K2min values for different search spaces within the same BWP. For example, if K0min is zero, all of the search spaces per BWP need to decode the PDCCH and receive the downlink data in the PUSCH within the same slot, which may cause undesirable pressure to process the PDCCH quickly. On the other hand, if K0min is a large number, all of the search spaces per BWP may experience a large delay in decoding of the PDCCH, which may cause undesirable delays in receiving a downlink data in a corresponding PUSCH.

According to some aspects of a disclosure, K0 and K2 values may be determined for each search space, regardless of whether search spaces are within the same BWP or not. Because each search space may be associated with its own K0 value and K2 value, different delays may be applied for different search spaces. Similarly, K0min and K2min values may be determined for each search space that is suitable for configuring K0min and K2min values. Hence, even for search spaces within the same BWP, each search space may be associated with its own K0 value and K2 value and its own K0min and K2min values. As such, flexibility in configuring delays associated with a downlink control channel (e.g., PDCCH) for different search spaces is increased.

Figure 8:
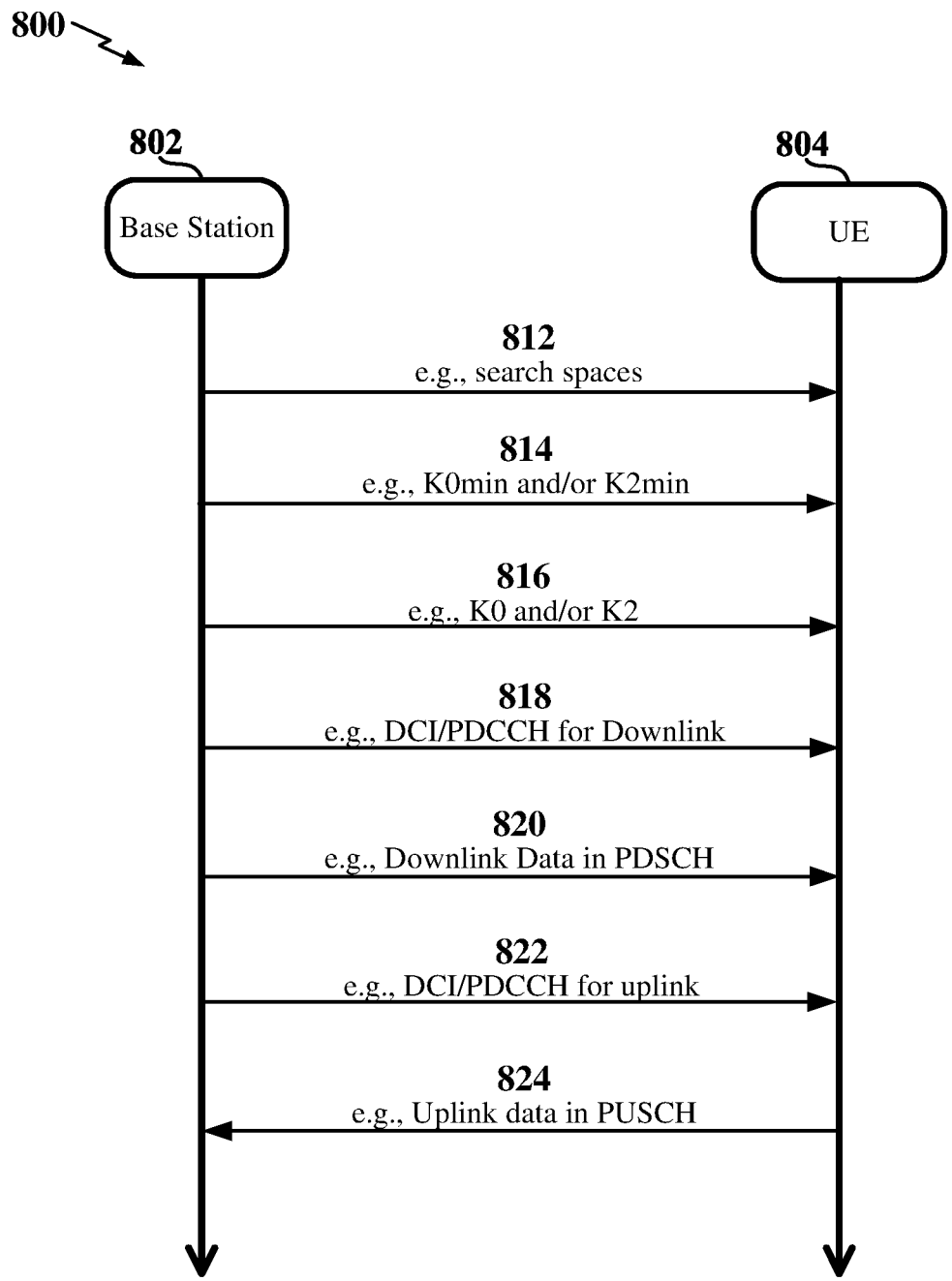
FIG. 8 is an example diagram illustrating communication between a base station and a user equipment according to some aspects of the disclosure.

FIG. 8 is an example diagram 800 illustrating communication between a base station 802 and a UE 804 according to some aspects of the disclosure. In an aspect, the base station 802 may be a base station, a gNB, or a network access node as illustrated in any one or more of FIG. 1, FIG. 2, and/or FIG. 3. In an aspect, the UE 804 may be a UE as illustrated in any one or more of FIG. 1, FIG. 2, and/or FIG. 3.

The base station 802 may determine search spaces where a downlink control channel (e.g., PDCCH) may be decoded, where each search space may include one or more CCEs. In particular, the base station 802 may determine first search spaces that are potential locations where a first downlink control channel for downlink scheduling of a downlink data (e.g., in a PDSCH) may be decoded. The base station 802 may determine second search spaces that are potential locations where a second downlink control channel for uplink scheduling of an uplink data (e.g., in a PUSCH) may be decoded. In an aspect, each of the first search spaces may include at least one first respective CCE, and each of the second search spaces may include at least one respective second CCE. In an aspect, the first search spaces and/or the second search spaces may be located within a BWP (e.g., the same BWP). After determining the first search spaces and the second search spaces, the base station may transmit at 812 information indicating the first search spaces and/or the second search spaces to the UE 804. In an aspect, each first search space may be a user specific search space and/or a common search space, and each second search space may be a user specific search space and/or a common search space. For example, the information indicating the first search spaces and/or the second search spaces may be transmitted via RRC signaling, where an RRC parameter "searchSpaceId" may be used to indicate each of the first search spaces and/or the second search spaces.

The base station 802 may configure first delays (e.g., K0 values), where each first delay indicates a respective time delay between a resource location (e.g., slot location) of the first downlink control channel (e.g., PDCCH) and a resource location (e.g., slot location) of a downlink data (e.g., in a PDSCH) associated with the first downlink control channel and is configured for a respective first search space of the first search spaces. For example, each first search space may be configured with a respective first delay. The downlink data may be the downlink data in a PDSCH, and the first downlink control channel may be a PDCCH for scheduling the downlink data. In an aspect, the resource location of the first downlink control channel and the resource location of the downlink data may be a slot location of the first downlink control channel and a slot location of the downlink data, respectively. For example, each first delay for a respective search space may be a respective K0 value that indicates a respective slot offset between a slot location of a PDCCH for the downlink data and a slot location of scheduled downlink of the downlink data in a PDSCH for the respective search space.

The base station 802 may configure second delays (e.g., K2 values), where each second delay indicates a respective time delay between a resource location (e.g., slot location) of the second downlink control channel (e.g., PDCCH) and a resource location (e.g., slot location) of a uplink data (e.g., in a PUSCH) associated with the second downlink control channel and is configured for a respective second search space of the second search spaces. For example, each second search space may be configured with a respective second delay. The uplink data may be the uplink data in a PUSCH, and the second downlink control channel may be a PDCCH for scheduling the uplink data. In an aspect, the resource location of the second downlink control channel and the resource location of the uplink data may be a slot location of the second downlink control channel and a slot location of the uplink data, respectively. For example, each second delay for a respective search space may be a respective K2 value that indicates a respective slot offset between a slot location of a PDCCH for the uplink data and a slot location of scheduled uplink of the uplink data in a PUSCH for the respective search space.

In an aspect, the base station 802 may determine a minimum first delay indicating a minimum time delay between the resource location of the first downlink control channel and the resource location of the downlink data associated with the first downlink control channel per first search space for one or more of the first search spaces. In an aspect, the base station 802 may determine a minimum second delay indicating a minimum time delay between the resource location of the second downlink control channel and the resource location of the uplink data associated with the second downlink control channel per second search space for one or more second search spaces. For example, for a larger K0min and/or K2min, an available time for blind decoding of a corresponding PDCCH may be longer, which relaxes a time restriction in the blind decoding but may cause a longer delay in decoding and processing the corresponding PDCCH. In one example, if a base station 802 may determine that a low-latency in decoding the PDCCH is not needed and/or that the UE 804 needs additional time for decoding the PDCCH, the base station 802 may define a larger minimum first delay and/or a larger minimum second delay. Otherwise, in this example, the base station 802 may define a shorter minimum first delay and/or a shorter minimum second delay. For example, for a particular search space, a first delay may be at least a minimum first delay. Similarly, for example, for a particular search space, a second delay may be at least a minimum second delay for the particular search space.

In particular, in an aspect, the base station 802 may determine at least one minimum first delay (e.g., K0min), each indicating a minimum time delay between the resource location of the first downlink control channel and the resource location of the downlink data associated with the first downlink control channel and is configured for the at least one first search space of the search spaces, respectively. For example, for one or more of the first search spaces, each first search space may be configured with a respective minimum first delay. For example, for one or more of the first search spaces, each minimum first delay for a respective search space may be a respective K0min value that indicates a respective minimum slot offset between a slot location of a PDCCH for the downlink data and a slot location of scheduled downlink of the downlink data in a PDSCH for the respective search space.

In an aspect, at least one periodicity respectively associated with the at least one first search space may be longer than one slot. For example, the base station 802 may configure minimum first delays for first search spaces with a periodicity of longer than one slot, but not for the other first search spaces with a periodicity not exceeding one slot. Thus, minimum first delays may be applicable only for first search spaces with a periodicity of longer than one slot, and may not be applicable for other first search spaces with a periodicity not exceeding one slot. Therefore, in this example, the at least one first search space for which the at least one minimum first delay is configured may have the periodicity of longer than one slot, while the other first search spaces may have the periodicity that does not exceed one slot and may not be configured with minimum first delays. In an example, if a particular search space is not configured with a minimum first delay, a first delay for the particular search space may be any value.

In an aspect, the base station 802 may determine at least one minimum second delay (e.g., K2min), each indicating a minimum time delay between the resource location of the second downlink control channel and the resource location of the uplink data associated with the second downlink control channel and is configured for the at least one second search space of the search spaces, respectively. For example, for one or more of the second search spaces, each second search space may be configured with a respective minimum second delay. For example, for one or more of the second search spaces, each minimum second delay for a respective search space may be a respective K2min value that indicates a respective minimum slot offset between a slot location of a PDCCH for the uplink data and a slot location of scheduled uplink of the uplink data in a PUSCH for the respective search space.

In an aspect, at least one periodicity respectively associated with the at least one second search space may be longer than one slot. For example, the base station 802 may configure minimum second delays for second search spaces with periodicity of longer than one slot, but not for the other second search spaces with periodicity not exceeding one slot. Thus, minimum second delays may be applicable only for second search spaces with a periodicity of longer than one slot, and may not be applicable for other second search spaces with a periodicity not exceeding one slot. Therefore, in this example, the at least one second search space for which the at least one minimum second delay is configured may have the periodicity of longer than one slot, while the other second search spaces may have the periodicity that does not exceed one slot and may not be configured with minimum second delays. In an example, if a particular search space is not configured with a minimum second delay, a second delay for the particular search space may be any value.

In an aspect, each of the at least one minimum first delay may be configured based on a periodicity of a respective first search space of the at least one first search space. In an aspect, each of the at least one minimum second delay may be configured based on a periodicity of a respective second search space of the at least one second search space. In an example, for a BWP, the base station may configure a minimum first delay and/or a minimum second delay to be one half of the periodicity of the corresponding search space. For example, the base station may configure K0min and/or K2min per search space based on equation(s) K0min=floor (n/2) and/or K2min=floor(n/2), where n is the periodicity of a corresponding search space in terms of number of slots. For example, the periodicity (e.g., n) of a particular search space in terms of number of slots may be conveyed by the base station, e.g., via an RRC parameter "monitoringSlot-PeriodicityAndOffset" for the particular search space that is indicated as an RRC parameter "searchSpaceId." In an aspect, the base station may convey an indication of how the at least one minimum first delay and/or the at least one minimum second delay may be determined based on a periodicity of a corresponding search space, such as the above equations.

After configuring the at least one first minimum delay and/or the at least one second minimum delay as discussed above, the base station 802 may transmit at 814 the at least one first minimum delay and/or the at least one second minimum delay to the UE 804. In an aspect, the base station 802 may transmit the at least one first minimum delay and/or the at least one second minimum delay via an RRC message.

Further, after configuring the first delays and/or the second delays as discussed above, the base station 802 may transmit at 816 the first delays (e.g., K0 values) and/or the second delays (e.g., K2 values) to the UE 804. In an aspect, the first delays may be transmitted via first DCI on the first downlink control channel. In an aspect, the second delays may be transmitted via second DCI on the second downlink control channel Hence, for example, the first delays for first search spaces and/or the second delays for the second search spaces may be communicated dynamically via the first DCI and/or the second DCI, respectively, while the at least one first minimum delay and/or the at least one second minimum delay may be communicated semi-statically via RRC signaling as discussed above. For example, the first DCI may be DCI format 1 for a downlink assignment, and the second DCI may be DCI format 0 for an uplink grant.

After receiving information indicating the first search spaces and receiving the first delays, the UE 804 may perform detection for the first downlink control channel at the first search spaces respectively based on the first delays. For example, the UE 804 may attempt blind decoding of the first downlink control channel at various first search spaces based on the first delays configured respectively for the first search spaces. For example, a longer first delay may provide more time for decoding and processing the first downlink control channel.

A single slot blind detection limit may indicate a number of maximum blind decodes that may be performed per a single slot, while multi-slot blind detection limit may indicate a number of maximum blind decodes that may be performed over P slots, where P is greater than 1. In some cases, the multi-slot blind detection limit may be utilized instead of the single slot blind detection limit. In an aspect, the at least one minimum first delay may cause at least one first downlink control channel detection limit for the first downlink control channel to be over multiple slots. Thus, in an aspect, in response to receiving the at least one minimum first delay configured for the at least one first search space, the UE 804 may determine at least one first downlink control channel detection limit for the first downlink control channel to be over multiple slots (e.g., as a multi-slot blind detection limit), where the UE 804 may perform the detection for the first downlink control channel at the at least one first search space further based on the first downlink control channel detection limit over first multiple slots. For example, when a minimum first delay (e.g., K0min) is configured for a particular search space, the UE 804 may determine that the blind decoding limit for the first downlink control channel is a multi-slot detection limit over the first multiple slots, instead of a single-slot detection limit applied for a single slot. Hence, the configuration of the minimum first delay for a particular search space may implicitly trigger the UE 804 to determine that the blind decoding limit for the first downlink control channel is the multi-slot detection limit.

In an aspect, the UE 804 may determine a first downlink control channel detection limit for the first downlink control channel to be over a single slot if a corresponding one of the least one minimum first delay is less than or equal to a limit threshold, and may determine the first downlink control channel detection limit for the first downlink control channel to be over multiple slots if a corresponding one of the least one minimum first delay exceeds the limit threshold. For example, if a minimum first delay (e.g., K0min) for a particular search space is less than or equal to the limit threshold of 0 or 1 slot, the minimum first delay may be too small to provide the first downlink control channel detection limit to be over multiple slots and thus the UE 804 may determine the first downlink control channel detection limit to be over a single slot. On the other hand, if the minimum first delay (e.g., K0min) for this particular search space exceeds the limit threshold of 0 or 1 slot, the minimum first delay may be large enough for a multi-slot detection limit and thus the UE 804 may determine the first downlink control channel detection limit to be over multiple slots.

The base station 802 at 818 may transmit to the UE 804 the first downlink control channel in a first search space of the first search spaces that corresponds to the resource location of the first downlink control channel. For example, the base station 802 may transmit the PDCCH for the downlink data in one of the search spaces that is determined by the base station 802 and corresponds to the slot location for communication of the PDCCH for the downlink data. The first DCI may be transmitted in the PDCCH for the downlink data.

After the base station 802 transmits the first downlink channel, the base station 802 at 820 may transmit to the UE 804 the downlink data in the resource location of the downlink data based on a first delay of first delays that is configured for the first search space of the first search spaces where the first downlink channel is transmitted. For example, the base station 802 may transmit the downlink data in the PDSCH in the slot location of the downlink data after a time delay according to one of the first delays that is configured for respective one of the first search spaces where the PDCCH for the downlink data is communicated.

In an aspect, the base station 802 may transmit the downlink data at the resource location of the downlink data based on the at least one minimum first delay when a frequency range of the first downlink control channel exceeds a frequency threshold and/or when a subcarrier spacing of the first downlink control channel exceeds a subcarrier spacing threshold. For example, the frequency threshold may be based on a highest frequency in FR2, which is 52600 MHz, and/or the subcarrier spacing threshold may be 120 kHz. As discussed above, the flexibility in assigning K0min values is more desired for a higher frequency and/or a larger subcarrier spacing that results shorter symbols and less available time for decoding and processing a PDCCH. Thus, for example, K0min per search space may be determined for a higher frequency and/or a larger subcarrier spacing, but may not be determined for a lower frequency and/or a smaller subcarrier spacing.

After receiving information indicating the second search spaces and receiving the second delays, the UE 804 may perform detection for the second downlink control channel at the second search spaces respectively based on the second delays. For example, the UE 804 may attempt blind decoding of the second downlink control channel at various second search spaces based on the second delays configured respectively for the second search spaces. For example, a longer second delay may provide more time for decoding and processing the second downlink control channel.

In an aspect, the at least one minimum second delay may cause at least one second downlink control channel detection limit for the second downlink control channel to be over multiple slots. Thus, in an aspect, in response to receiving the at least one minimum second delay configured for the at least one second search space, the UE 804 may determine at least one second downlink control channel detection limit for the second downlink control channel to be over multiple slots (e.g., as a multi-slot blind detection limit), where the UE 804 may perform the detection for the second downlink control channel at the at least one second search space further based on the second downlink control channel detection limit over second multiple slots. For example, when a minimum second delay (e.g., K2min) is configured for a particular search space, the UE 804 may determine that the blind decoding limit for the second downlink control channel is a multi-slot detection limit over second multiple slots, instead of a single-slot detection limit applied for a single slot. Hence, the configuration of the minimum second delay for a particular search space may implicitly trigger the UE 804 to determine that the blind decoding limit for the second downlink control channel is the multi-slot detection limit.

In an aspect, the UE 804 may determine a second downlink control channel detection limit for the second downlink control channel to be over a single slot if a corresponding one of the least one minimum second delay is less than or equal to a limit threshold, and determine the second downlink control channel detection limit for the second downlink control channel to be over multiple slots if a corresponding one of the least one minimum second delay exceeds the limit threshold. For example, if a minimum second delay (e.g., K2min) for a particular search space is less than or equal to the limit threshold of 0 or 1 slot, the minimum second delay may be too small to provide the second downlink control channel detection limit to be over multiple slots and thus the UE 804 may determine the second downlink control channel detection limit to be over a single slot. On the other hand, if the minimum second delay (e.g., K2min) for this particular search space exceeds the limit threshold of 0 or 1 slot, the minimum second delay may be large enough for a multi-slot detection limit and thus the UE 804 may determine the second downlink control channel detection limit to be over multiple slots.

The base station 802 at 822 may transmit to the UE 804 the second downlink control channel in a second search space of the second search spaces that corresponds to the resource location of the second downlink control channel. For example, the base station 802 may transmit the PDCCH for the uplink data in one of the search spaces that is determined by the base station 802 and corresponds to the slot location for communication of the PDCCH for the uplink data. The second DCI may be transmitted in the PDCCH for the uplink data.

After the UE 804 receives the second downlink control channel, the UE 804 at 824 may transmit to the base station 802 the uplink data in the resource location of the uplink data based on a second delay of second delays that is configured for the second search space of the second search spaces where the second downlink channel is transmitted. For example, the UE 804 may transmit the uplink data in the PUSCH in the slot location of the uplink data after a time delay according to one of the second delays that is configured for respective one of the second search spaces where the PDCCH for the uplink data is communicated.

In an aspect, the UE 804 may transmit the uplink data at the resource location of the uplink data based on the at least one minimum second delay when a frequency range of the second downlink control channel exceeds a frequency threshold and/or when a subcarrier spacing of the second downlink control channel exceeds a subcarrier spacing threshold. For example, the frequency threshold may be based on a highest frequency in FR2, which is 52600 MHz, and/or the subcarrier spacing threshold may be 120 kHz. As discussed above, the flexibility in assigning K2min values is more desired for a higher frequency and/or a larger subcarrier spacing that results shorter symbols and less available time for decoding and processing a PDCCH. Thus, for example, K2min per search space may be determined for a higher frequency and/or a larger subcarrier spacing, but may not be determined for a lower frequency and/or a smaller subcarrier spacing.

In an aspect, the base station 802 may also configure and transmit to the UE 804 a minimum first delay between the resource location of the first downlink control channel and the resource location of the downlink data associated with the first downlink control channel per BWP and/or a minimum second delay between the resource location of the second downlink control channel and the resource location of the uplink data associated with the second downlink control channel per BWP. In an aspect, the UE 804 may receive the minimum first delay configured for a BWP, but may perform the detection for the first downlink control channel at the at least one first search space based on the at least one minimum first delay (e.g., configured per search space) while ignoring the minimum first delay configured for the BWP. Further, in an aspect, the UE 804 may receive the minimum second delay configured for a BWP, but may perform the detection for the second downlink control channel at the at least one second search space based on the at least one minimum second delay (e.g., configured per search space) while ignoring the minimum second delay configured for the BWP. For example, if the UE 804 receives a minimum first delay and/or a minimum second delay per search space and also receives a minimum first delay and/or a minimum second delay per BWP, the minimum first delay and/or a minimum second delay per search space may override the minimum first delay and/or a minimum second delay per BWP, such that the UE 804 considers the minimum first delay and/or a minimum second delay per search space while ignoring the minimum first delay and/or a minimum second delay per BWP.

It is noted that the order in which the above processes 812-824 take place is not limited to the order explained above and illustrated in FIG. 8. Hence, the above processes 812-824 may take place in different orders than the orders explained above and illustrated in FIG. 8.

FIGS. 9A-9D are example diagrams illustrating various delays between a slot location of a downlink control channel and a slot location of a corresponding downlink data/uplink data per search space. FIG. 9A is an example diagram 900 illustrating a delay between a slot location of a PDCCH and a slot location of a corresponding downlink data in a PDSCH for a particular search space. In FIG. 9A, the PDCCH for the downlink data is received at a search space 912 in slot n 902, where n is an integer number. Because the K0 value for the search space 912 is 3, the downlink data in the PDSCH 914 is received in slot n+3 904. FIG. 9B is an example diagram 920 illustrating a delay between a slot location of a PDCCH and a slot location of a corresponding downlink data in a PDSCH for a different search space. In FIG. 9B, the PDCCH for the downlink data is received at a search space 932 in slot n 902. Because the K0 value for the search space 912 is 1, the downlink data in the PDSCH 914 is received in slot n+1 924.

FIG. 9C is an example diagram 940 illustrating a delay between a slot location of a PDCCH and a slot location of a corresponding uplink data in a PUSCH for a particular search space. In FIG. 9C, the PDCCH for the uplink data is received at a search space 952 in slot n 902. Because the K2 value for the search space 952 is 0, the uplink data in the PDSCH 914 is transmitted in the same slot where the PDCCH is received, which is in slot n 902. FIG. 9D is an example diagram 960 illustrating a delay between a slot location of a PDCCH and a slot location of a corresponding uplink data in a PUSCH for a different search space. In FIG. 9D, the PDCCH for the uplink data is received at a search space 972 in slot n 902. Because the K2 value for the search space 972 is 2, the uplink data in the PDSCH 914 is transmitted in slot n+2 964.

Figure 10:
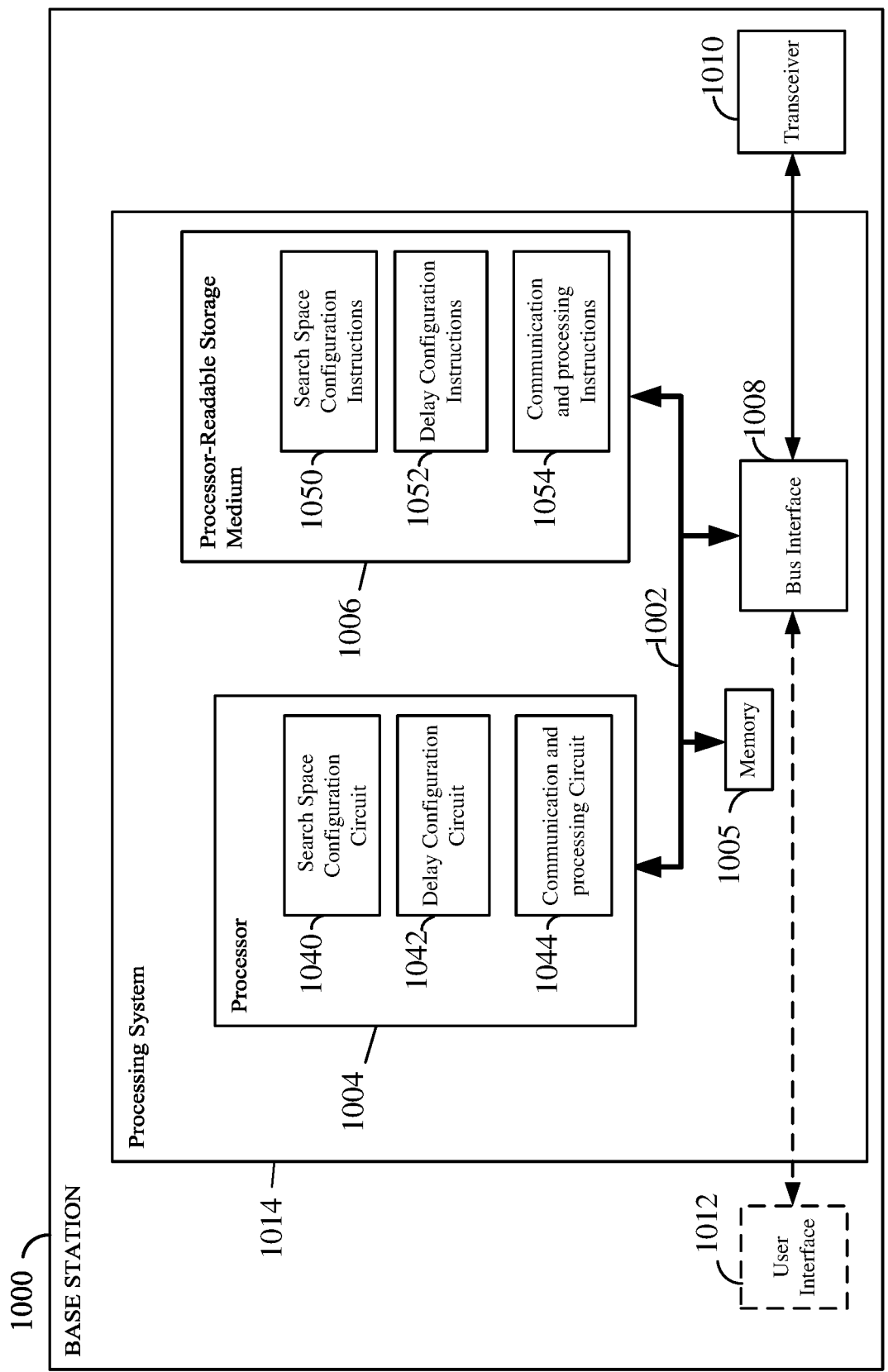
FIG. 10 is a block diagram illustrating an example of a hardware implementation of a base station employing a processing system according to some aspects of the disclosure.

FIG. 10 is a block diagram illustrating an example of a hardware implementation for a base station 1000 employing a processing system 1014. For example, the base station 1000 may be a base station as illustrated in any one or more of FIGS. 1, 2, 3, and/or 8.

The base station 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1000 may be configured to perform any one or more of the functions described herein. That is, the processor 1004, as utilized in a base station 1000, may be used to implement any one or more of the processes and procedures described below and illustrated in FIGS. 11 and 12.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and processor-readable media (represented generally by the processor-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided. Of course, such a user interface 1012 is optional, and may be omitted in some examples, such as a base station.

In some aspects of the disclosure, the processor 1004 may include search space configuration circuitry 1040 configured for various functions, including, for example, determining a plurality of first search spaces indicating potential locations for a first downlink control channel or a plurality of second search spaces indicating potential locations for a second downlink control channel or both. For example, the search space configuration circuitry 1040 may be configured to implement one or more of the functions described below in relation to FIGS. 11 and 12, including, e.g., blocks 1102 and 1202.

In some aspects of the disclosure, the processor 1004 may include delay configuration circuitry 1042 configured for various functions, including, for example, configuring a plurality of first delays, or a plurality of second delays, or both, wherein each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces. For example, the delay configuration circuitry 1042 may be configured to implement one or more of the functions described below in relation to FIGS. 11 and 12, including, e.g., blocks 1104 and 1254.

In some aspects, the delay configuration circuitry 1042 may be configured to configure and transmit at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively. For example, the delay configuration circuitry 1042 may be configured to implement one or more of the functions described below in relation to FIG. 12, including, e.g., block 1206.

In some aspects, the delay configuration circuitry 1042 may be configured to configure and transmit at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively. For example, the delay configuration circuitry 1042 may be configured to implement one or more of the functions described below in relation to FIG. 12, including, e.g., block 1208.

In some aspects of the disclosure, the processor 1004 may include communication and processing circuitry 1044 configured for various functions, including, for example, transmitting the plurality of first delays or the plurality of second delays or both to a UE. For example, the communication and processing circuitry 1044 may be configured to implement one or more of the functions described below in relation to FIGS. 11 and 12, including, e.g., blocks 1106 and 1256.

In some aspects, the communication and processing circuitry 1044 may be configured to transmit information indicating the plurality of first search spaces, or the plurality of second search spaces, or both. For example, the communication and processing circuitry 1044 may be configured to implement one or more of the functions described below in relation to FIG. 12, including, e.g., block 1204.

In some aspects, the communication and processing circuitry 1044 may be configured to transmit at least one of: the first downlink control channel in a first search space of the plurality of first search spaces that corresponds to the resource location of the first downlink control channel, or the first downlink control channel in a first search space of the plurality of first search spaces that corresponds to the resource location of the first downlink control channel. For example, the communication and processing circuitry 1044 may be configured to implement one or more of the functions described below in relation to FIG. 12, including, e.g., block 1258.

In some aspects, the communication and processing circuitry 1044 may be configured to transmit the downlink data in the resource location of the downlink data based on a first delay of the plurality of first delays that is configured for the first search space. For example, the communication and processing circuitry 1044 may be configured to implement one or more of the functions described below in relation to FIG. 12, including, e.g., block 1260.

In some aspects, the communication and processing circuitry 1044 may be configured to receive the uplink data in the resource location of the uplink data based on a second delay of the plurality of second delays that is configured for the second search space. For example, the communication and processing circuitry 1044 may be configured to implement one or more of the functions described below in relation to FIG. 12, including, e.g., block 1262.

The processor 1004 is responsible for managing the bus 1002 and general processing, including the execution of software stored on the processor-readable storage medium 1006. The software, when executed by the processor 1004, causes the processing system 1014 to perform the various functions described below for any particular apparatus. The processor-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1006. The processor-readable storage medium 1006 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1006 may reside in the processing system 1014, external to the processing system 1014, or distributed across multiple entities including the processing system 1014. The processor-readable storage medium 1006 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In one or more examples, the processor-readable storage medium 1006 may include search space configuration software/instructions 1050 configured for various functions, including, for example, determining a plurality of first search spaces indicating potential locations for a first downlink control channel or a plurality of second search spaces indicating potential locations for a second downlink control channel or both. For example, the search space configuration software/instructions 1050 may be configured to implement one or more of the functions described below in relation to FIGS. 11 and 12, including, e.g., blocks 1102 and 1202.

In some aspects of the disclosure, the processor-readable storage medium 1006 may include delay configuration software/instructions 1052 configured for various functions, including, for example, configuring a plurality of first delays, or a plurality of second delays, or both, wherein each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces. For example, the delay configuration software/instructions 1052 may be configured to implement one or more of the functions described below in relation to FIGS. 11 and 12, including, e.g., blocks 1104 and 1254.

In some aspects, the delay configuration software/instructions 1052 may be configured to configure and transmit at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively. For example, the delay configuration software/instructions 1052 may be configured to implement one or more of the functions described below in relation to FIG. 12, including, e.g., block 1206.

In some aspects, the delay configuration software/instructions 1052 may be configured to configure and transmit at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively. For example, the delay configuration software/instructions 1052 may be configured to implement one or more of the functions described below in relation to FIG. 12, including, e.g., block 1208.

In some aspects of the disclosure, the processor-readable storage medium 1006 may include communication and processing software/instructions 1054 configured for various functions, including, for example, transmitting the plurality of first delays or the plurality of second delays or both to a UE. For example, the communication and processing software/instructions 1054 may be configured to implement one or more of the functions described below in relation to FIGS. 11 and 12, including, e.g., blocks 1106 and 1256.

In some aspects, the communication and processing software/instructions 1054 may be configured to transmit information indicating the plurality of first search spaces, or the plurality of second search spaces, or both. For example, the communication and processing software/instructions 1054 may be configured to implement one or more of the functions described below in relation to FIG. 12, including, e.g., block 1204.

In some aspects, the communication and processing software/instructions 1054 may be configured to transmit at least one of: the first downlink control channel in a first search space of the plurality of first search spaces that corresponds to the resource location of the first downlink control channel, or the first downlink control channel in a first search space of the plurality of first search spaces that corresponds to the resource location of the first downlink control channel. For example, the communication and processing software/instructions 1054 may be configured to implement one or more of the functions described below in relation to FIG. 12, including, e.g., block 1258.

In some aspects, the communication and processing software/instructions 1054 may be configured to transmit the downlink data in the resource location of the downlink data based on a first delay of the plurality of first delays that is configured for the first search space. For example, the communication and processing software/instructions 1054 may be configured to implement one or more of the functions described below in relation to FIG. 12, including, e.g., block 1260.

In some aspects, the communication and processing software/instructions 1054 may be configured to receive the uplink data in the resource location of the uplink data based on a second delay of the plurality of second delays that is configured for the second search space. For example, the communication and processing software/instructions 1054 may be configured to implement one or more of the functions described below in relation to FIG. 12, including, e.g., block 1262.

Figure 11:
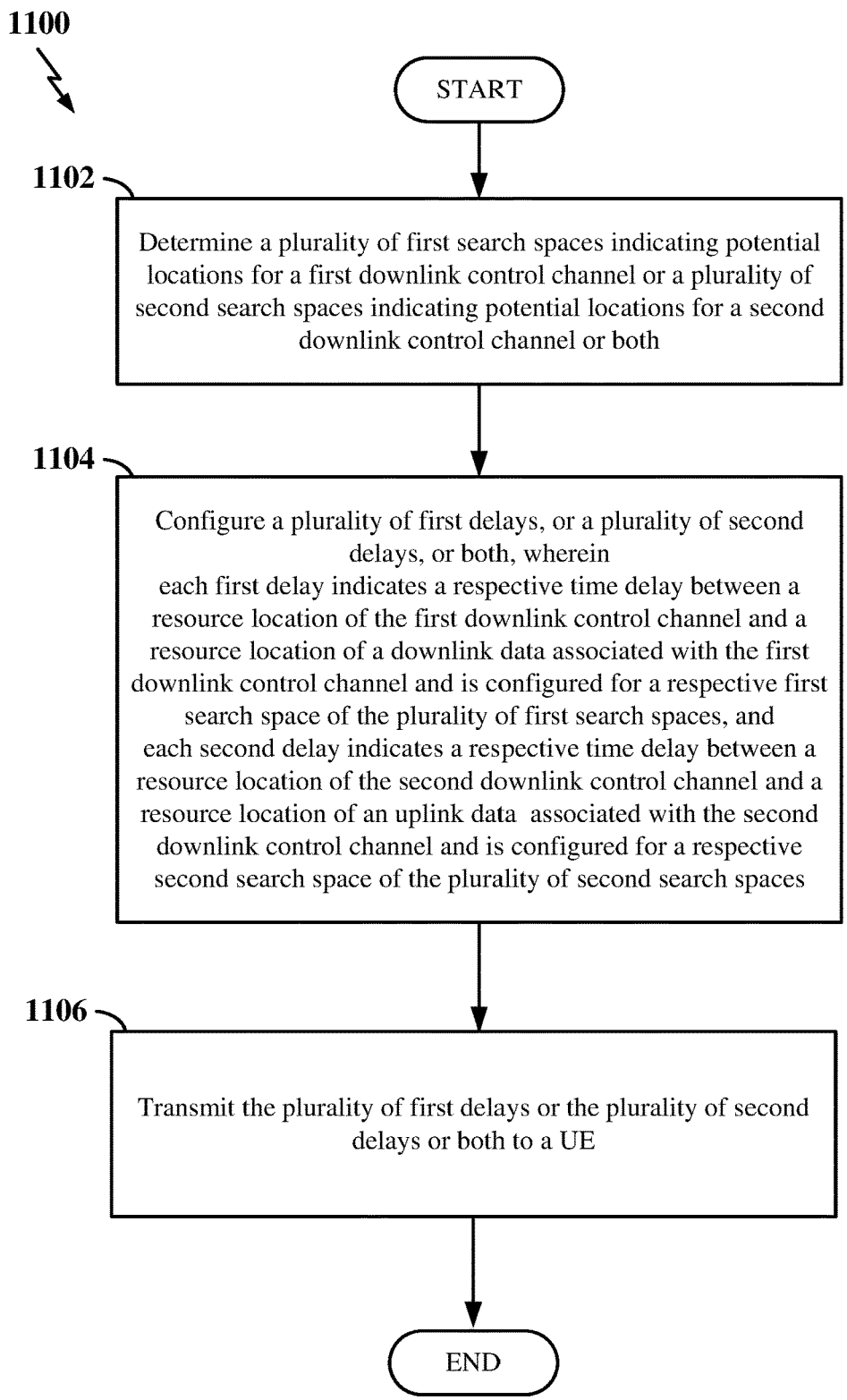
FIG. 11 is a flow chart illustrating an exemplary process (e.g., a method) of wireless communications, at a base station in accordance with some aspects of the disclosure.

FIG. 11 is a flow chart illustrating an exemplary process 1100 (e.g., a method) of wireless communications, at base station in accordance with some aspects of the disclosure. As described below, some or all illustrated features may be omitted in a particular implementation within the scope of the present disclosure, and some illustrated features may not be required for implementation of all embodiments. In some examples, the process 1100 may be carried out by the base station 1000 illustrated in FIG. 10. In some examples, the process 1100 may be carried out by any suitable apparatus or means for carrying out the functions or algorithms described herein.

At block 1102, the base station may determine a plurality of first search spaces indicating potential locations for a first downlink control channel or a plurality of second search spaces indicating potential locations for a second downlink control channel or both.

At block 1104, the base station may configure a plurality of first delays, or a plurality of second delays, or both, wherein each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces.

At block 1106, the base station may transmit the plurality of first delays or the plurality of second delays or both to a UE.

Figure 12A:
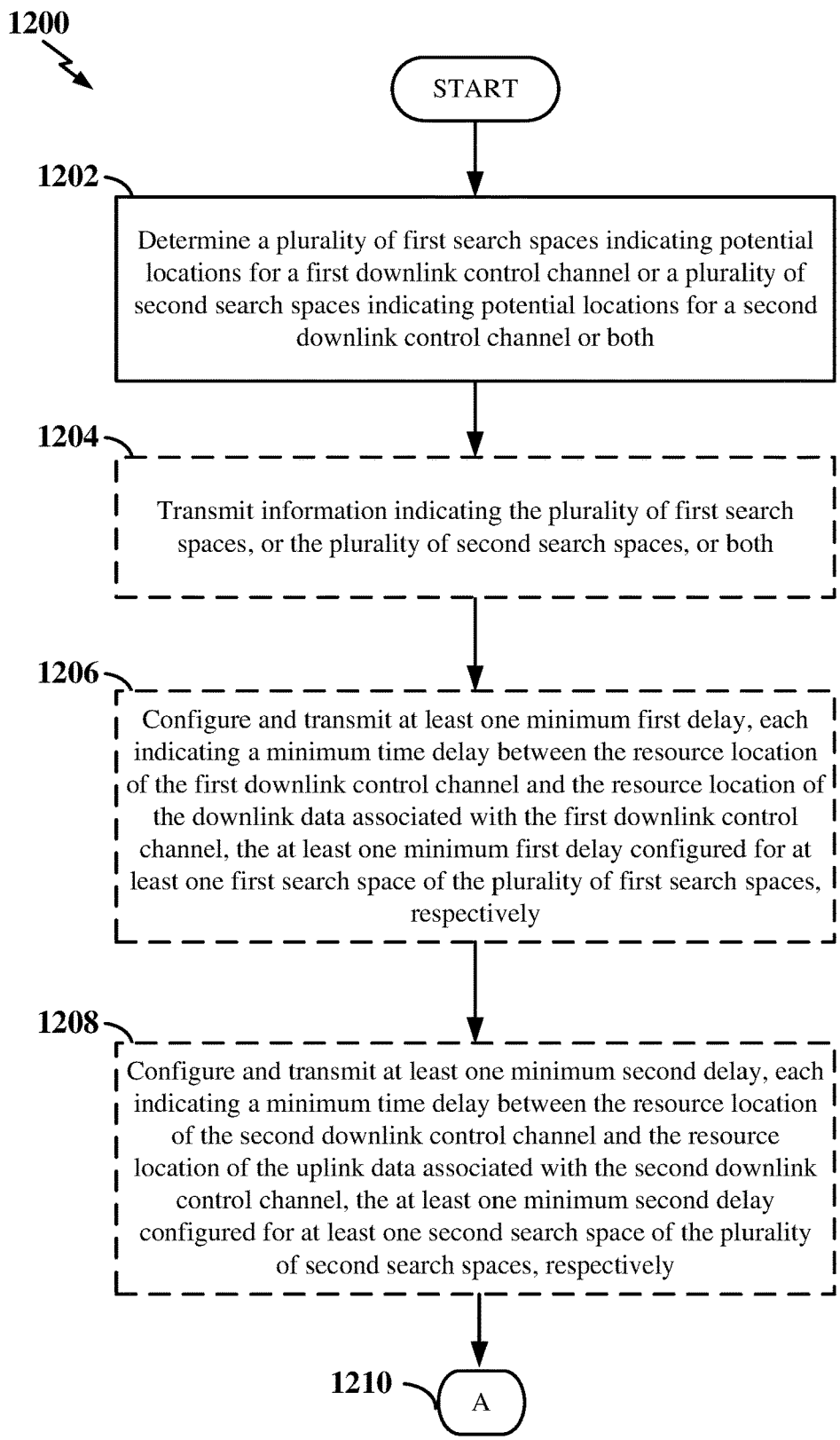
FIG. 12A is a flow chart illustrating an exemplary process (e.g., a method) of wireless communications, at a base station in accordance with some aspects of the disclosure.

FIG. 12A is a flow chart illustrating an exemplary process 1200 (e.g., a method) of wireless communications, at a base station in accordance with some aspects of the disclosure. As described below, some or all illustrated features may be omitted in a particular implementation within the scope of the present disclosure, and some illustrated features may not be required for implementation of all embodiments. In some examples, the process 1200 may be carried out by the base station 1000 illustrated in FIG. 10. In some examples, the process 1200 may be carried out by any suitable apparatus or means for carrying out the functions or algorithms described herein.

At block 1202, the base station may determine a plurality of first search spaces indicating potential locations for a first downlink control channel or a plurality of second search spaces indicating potential locations for a second downlink control channel or both. In an aspect, each of the plurality of first search spaces may include at least one respective first CCE, and each of the plurality of second search spaces may include at least one respective second CCE.

At block 1204, the base station may transmit information indicating the plurality of first search spaces, or the plurality of second search spaces, or both to a UE.

At block 1206, the base station may configure and transmit at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively.

At block 1208, the base station may configure and transmit at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively.

In an aspect, the at least one minimum first delay or the at least one minimum second delay or both may be transmitted via an RRC message.

In an aspect, at least one periodicity respectively associated with the at least one first search space may be longer than one slot, and at least one periodicity respectively associated with the at least one second search space may be longer than one slot.

In an aspect, each of the at least one minimum first delay may be configured based on a periodicity of a respective first search space of the at least one first search space, and each of the at least one minimum second delay may be configured based on a periodicity of a respective second search space of the at least one second search space.

In an aspect, the at least one minimum first delay may cause at least one first downlink control channel detection limit for the first downlink control channel to be over multiple slots, and the at least one minimum second delay may cause at least one first downlink control channel detection limit for the second downlink control channel to be over multiple slots.

At block 1210, the base station may perform additional features, as described below.

Figure 12B:
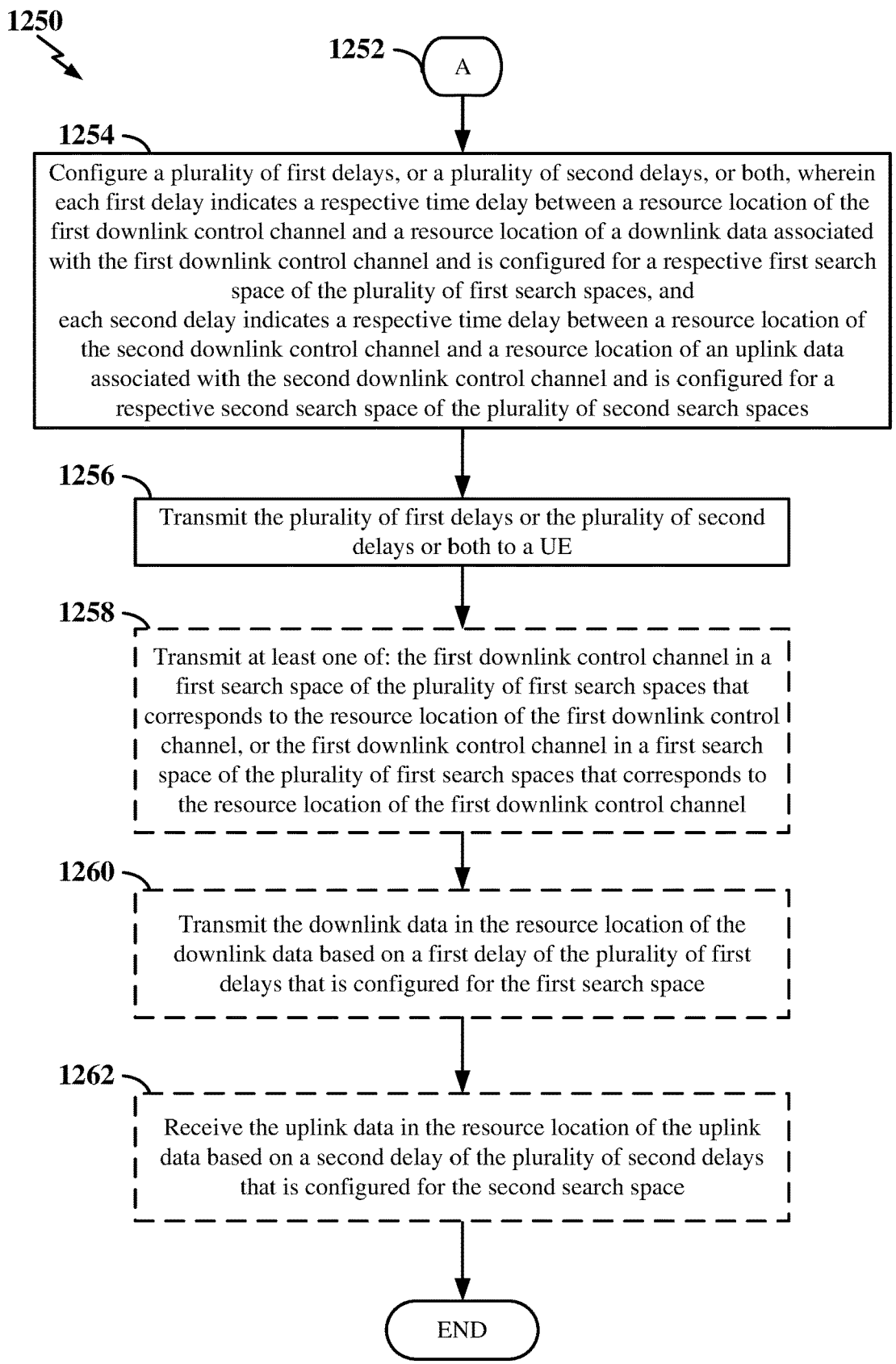
FIG. 12B is a flow chart illustrating an exemplary process (e.g., a method) of wireless communications continuing from the exemplary process of FIG. 12A, at the base station in accordance with some aspects of the disclosure.

FIG. 12B is a flow chart illustrating an exemplary process 1250 (e.g., a method) of wireless communications continuing from the exemplary process 1200 of FIG. 12A, at the base station in accordance with some aspects of the disclosure. At block 1252, the exemplary process 1250 may continue from the exemplary process 1200 of FIG. 12A. As described below, some or all illustrated features may be omitted in a particular implementation within the scope of the present disclosure, and some illustrated features may not be required for implementation of all embodiments. In some examples, the process 1250 may be carried out by the base station 1000 illustrated in FIG. 10. In some examples, the process 1250 may be carried out by any suitable apparatus or means for carrying out the functions or algorithms described herein.

At block 1254, the base station may configure a plurality of first delays, or a plurality of second delays, or both, wherein each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces.

In an aspect, the resource location of the first downlink control channel and the resource location of the downlink data may be a slot location of the first downlink control channel and a slot location of the downlink data, respectively, and the resource location of the first downlink control channel and the resource location of the downlink data may be a slot location of the first downlink control channel and a slot location of the downlink data, respectively.

At block 1256, the base station may transmit the plurality of first delays or the plurality of second delays or both to a UE.

At block 1258, the base station may transmit at least one of: the first downlink control channel in a first search space of the plurality of first search spaces that corresponds to the resource location of the first downlink control channel, or the first downlink control channel in a first search space of the plurality of first search spaces that corresponds to the resource location of the first downlink control channel.

In an aspect, the downlink data may be transmitted at the resource location of the downlink data based on the at least one minimum first delay when a frequency range of the first downlink control channel exceeds a frequency threshold and/or when a subcarrier spacing of the first downlink control channel exceeds a subcarrier spacing threshold. In an aspect, the downlink data may be transmitted at the resource location of the downlink data based on the at least one minimum first delay when a frequency range of the first downlink control channel exceeds a frequency threshold and/or when a subcarrier spacing of the first downlink control channel exceeds a subcarrier spacing threshold.

At block 1260, the base station may transmit the downlink data in the resource location of the downlink data based on a first delay of the plurality of first delays that is configured for the first search space.

At block 1262, the base station may receive the uplink data in the resource location of the uplink data based on a second delay of the plurality of second delays that is configured for the second search space.

In one configuration, the base station 1000 for wireless communication includes means for determining a plurality of first search spaces indicating potential locations for a first downlink control channel or a plurality of second search spaces indicating potential locations for a second downlink control channel or both, means for configuring a plurality of first delays, or a plurality of second delays, or both, and means for transmitting the plurality of first delays or the plurality of second delays or both to a UE. In an aspect, each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces.

In an aspect, the base station 1000 may further include means for transmitting at least one of: the first downlink control channel in a first search space of the plurality of first search spaces that corresponds to the resource location of the first downlink control channel, or the second downlink control channel in a second search space of the plurality of second search spaces that corresponds to the resource location of the second downlink control channel. In an aspect, the base station 1000 may further include means for transmitting the downlink data in the resource location of the downlink data based on a first delay of the plurality of first delays that is configured for the first search space. In an aspect, the base station 1000 may further include means for receiving the uplink data in the resource location of the uplink data based on a second delay of the plurality of second delays that is configured for the second search space. In an aspect, the base station 1000 may further include means for configuring and transmitting at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, and/or means for configuring and transmitting at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Figure 13:
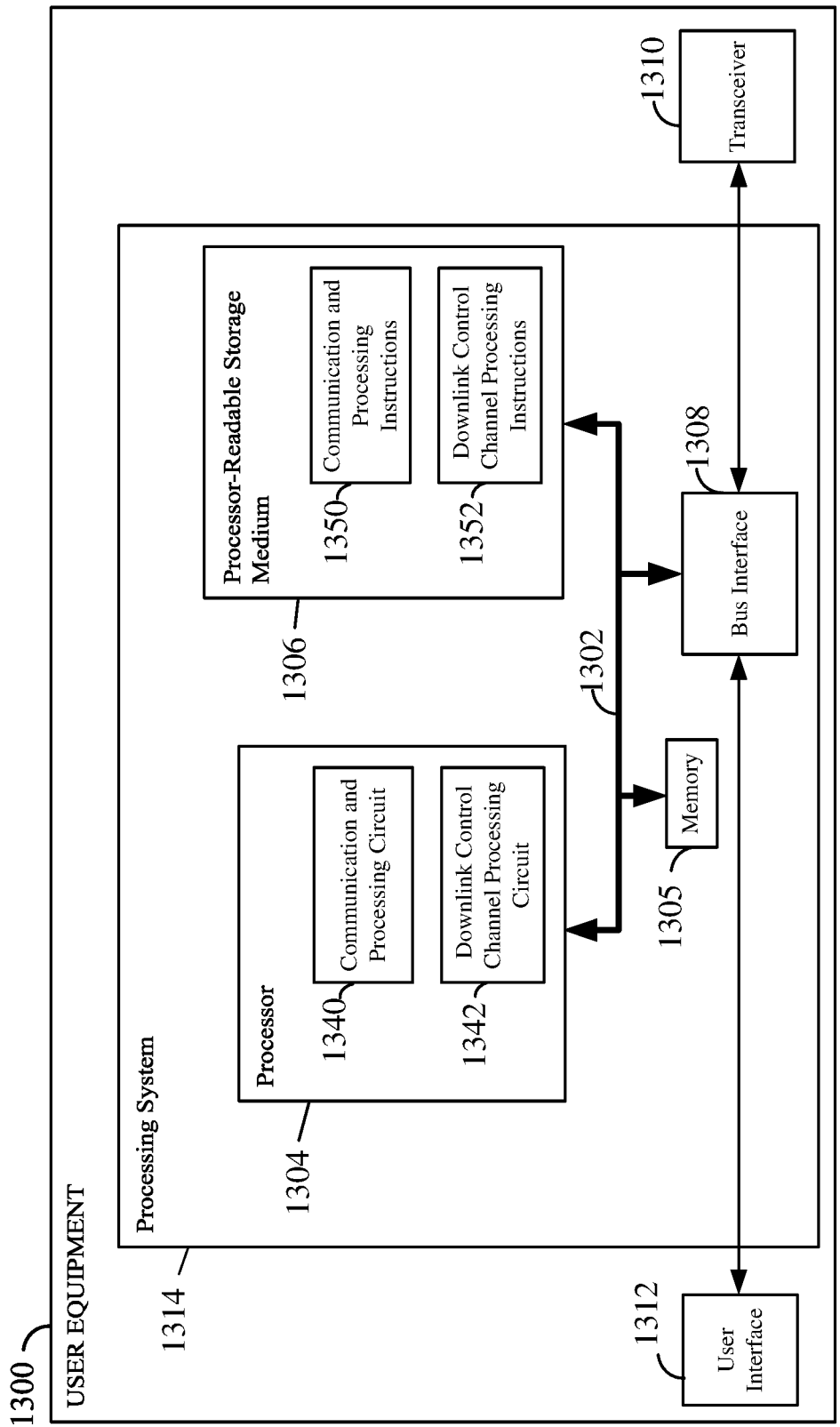
FIG. 13 is a block diagram illustrating an example of a hardware implementation of a user equipment employing a processing system according to some aspects of the disclosure.

FIG. 13 is a conceptual diagram illustrating an example of a hardware implementation for an exemplary user equipment 1300 employing a processing system 1314. In accordance with various aspects of the disclosure, an element, or any portion of an element, or any combination of elements may be implemented with a processing system 1314 that includes one or more processors 1304. For example, the user equipment 1300 may be a user equipment (UE) as illustrated in any one or more of FIGS. 1, 2, 3, and/or 8.

The processing system 1314 may be substantially the same as the processing system 1014 illustrated in FIG. 10, including a bus interface 1308, a bus 1302, memory 1305, a processor 1304, and a processor-readable storage medium 1306. Furthermore, the user equipment 1300 may include a user interface 1312 and a transceiver 1310 substantially similar to those described above in FIG. 10. That is, the processor 1304, as utilized in a user equipment 1300, may be used to implement any one or more of the processes described below and illustrated in FIGS. 14-15.

In some aspects of the disclosure, the processor 1304 may include communication and processing circuitry 1340 configured for various functions, including, for example, receiving information indicating a plurality of first search spaces, or a plurality of second search spaces, or both, wherein the plurality of first search spaces indicate potential locations for a first downlink control channel and the plurality of second search spaces indicate potential locations for a second downlink control channel. For example, the communication and processing circuitry 1340 may be configured to implement one or more of the functions described below in relation to FIGS. 14 and 15, including, e.g., blocks 1402 and 1502.

In some aspects, the communication and processing circuitry 1340 may be configured to receive a plurality of first delays, or a plurality of second delays, or both, wherein each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces. For example, the communication and processing circuitry 1340 may be configured to implement one or more of the functions described below in relation to FIGS. 14 and 15, including, e.g., blocks 1404 and 1574.

In some aspects, the communication and processing circuitry 1340 may be configured to receive at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively. For example, the communication and processing circuitry 1340 may be configured to implement one or more of the functions described below in relation to FIG. 15, including, e.g., block 1504.

In some aspects, the communication and processing circuitry 1340 may be configured to receive at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively. For example, the communication and processing circuitry 1340 may be configured to implement one or more of the functions described below in relation to FIG. 15, including, e.g., block 1506.

In some aspects, the communication and processing circuitry 1340 may be configured to receive a minimum first delay between the resource location of the first downlink control channel and the resource location of the downlink data associated with the first downlink control channel, the minimum first delay being configured for a BWP. For example, the communication and processing circuitry 1340 may be configured to implement one or more of the functions described below in relation to FIG. 15, including, e.g., block 1508.

In some aspects, the communication and processing circuitry 1340 may be configured to receive a minimum second delay between the resource location of the second downlink control channel and the resource location of the uplink data associated with the second downlink control channel, the minimum second delay being configured for the BWP. For example, the communication and processing circuitry 1340 may be configured to implement one or more of the functions described below in relation to FIG. 15, including, e.g., block 1510.

In some aspects, the communication and processing circuitry 1340 may be configured to receive at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel. For example, the communication and processing circuitry 1340 may be configured to implement one or more of the functions described below in relation to FIG. 15, including, e.g., block 1578.

In some aspects, the communication and processing circuitry 1340 may be configured to receive the downlink data in the resource location of the downlink data based on a first delay of the plurality of first delays that is configured for the first search space. For example, the communication and processing circuitry 1340 may be configured to implement one or more of the functions described below in relation to FIG. 15, including, e.g., block 1580.

In some aspects, the communication and processing circuitry 1340 may be configured to transmit the uplink data in the resource location of the uplink data based on the second delay of the plurality of second delays that is configured for the second search space. For example, the communication and processing circuitry 1340 may be configured to implement one or more of the functions described below in relation to FIG. 15, including, e.g., block 1582.

In some aspects of the disclosure, the processor 1304 may include downlink control channel processing circuitry 1342 configured for various functions, including, for example, performing at least one of: detection for the first downlink control channel at the plurality of first search spaces respectively based on the plurality of first delays, or detection for the second downlink control channel at the plurality of second search spaces respectively based on the plurality of second delays. For example, the downlink control channel processing circuitry 1342 may be configured to implement one or more of the functions described below in relation to FIGS. 14 and 15, including, e.g., blocks 1406 and 1576.

In some aspects, the downlink control channel processing circuitry 1342 may be configured, in response to receiving the at least one minimum first delay configured for the at least one first search space, to determine at least one first downlink control channel detection limit for the first downlink control channel to be over multiple slots, wherein the detection for the first downlink control channel is performed at the at least one first search space further based on the first downlink control channel detection limit over a first plurality of slots. For example, the downlink control channel processing circuitry 1342 may be configured to implement one or more of the functions described below in relation to FIG. 15, including, e.g., block 1544.

In some aspects, the downlink control channel processing circuitry 1342 may be configured, in response to receiving the at least one minimum second delay configured for the at least one second search space, to determine at least one second downlink control channel detection limit for the second downlink control channel to be over multiple slots, wherein the detection for the second downlink control channel is performed at the at least one second search space further based on the second downlink control channel detection limit over a second plurality of slots. For example, the downlink control channel processing circuitry 1342 may be configured to implement one or more of the functions described below in relation to FIG. 15, including, e.g., block 1546.

In some aspects, the downlink control channel processing circuitry 1342 may be configured to determine a first downlink control channel detection limit for the first downlink control channel to be over multiple slots if a corresponding one of the least one minimum first delay is less than or equal to a limit threshold. For example, the downlink control channel processing circuitry 1342 may be configured to implement one or more of the functions described below in relation to FIG. 15, including, e.g., block 1548.

In some aspects, the downlink control channel processing circuitry 1342 may be configured to determine the first downlink control channel detection limit for the first downlink control channel to be over a single slot if a corresponding one of the least one minimum first delay exceeds the limit threshold. For example, the downlink control channel processing circuitry 1342 may be configured to implement one or more of the functions described below in relation to FIG. 15, including, e.g., block 1550.

In some aspects, the downlink control channel processing circuitry 1342 may be configured to determine a second downlink control channel detection limit for the second downlink control channel to be over multiple slots if a corresponding one of the least one minimum second delay is less than or equal to a limit threshold. For example, the downlink control channel processing circuitry 1342 may be configured to implement one or more of the functions described below in relation to FIG. 15, including, e.g., block 1552.

In some aspects, the downlink control channel processing circuitry 1342 may be configured to determine the second downlink control channel detection limit for the second downlink control channel to be over a single slot if a corresponding one of the least one minimum second delay exceeds the limit threshold. For example, the downlink control channel processing circuitry 1342 may be configured to implement one or more of the functions described below in relation to FIG. 15, including, e.g., block 1554.

The processor 1304 is responsible for managing the bus 1302 and general processing, including the execution of software stored on the processor-readable storage medium 1306. The software, when executed by the processor 1304, causes the processing system 1314 to perform the various functions described below for any particular apparatus. The processor-readable storage medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1306. The processor-readable storage medium 1306 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1306 may reside in the processing system 1314, external to the processing system 1314, or distributed across multiple entities including the processing system 1314. The processor-readable storage medium 1306 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In one or more examples, the processor-readable storage medium 1306 may include communication and processing software/instructions 1350 configured for various functions, including, for example, receiving information indicating a plurality of first search spaces, or a plurality of second search spaces, or both, wherein the plurality of first search spaces indicate potential locations for a first downlink control channel and the plurality of second search spaces indicate potential locations for a second downlink control channel. For example, the communication and processing software/instructions 1350 may be configured to implement one or more of the functions described below in relation to FIGS. 14 and 15, including, e.g., blocks 1402 and 1502.

In some aspects, the communication and processing software/instructions 1350 may be configured to receive a plurality of first delays, or a plurality of second delays, or both, wherein each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces. For example, the communication and processing software/instructions 1350 may be configured to implement one or more of the functions described below in relation to FIGS. 14 and 15, including, e.g., blocks 1404 and 1574.

In some aspects, the communication and processing software/instructions 1350 may be configured to receive at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively. For example, the communication and processing software/instructions 1350 may be configured to implement one or more of the functions described below in relation to FIG. 15, including, e.g., block 1504.

In some aspects, the communication and processing software/instructions 1350 may be configured to receive at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively. For example, the communication and processing software/instructions 1350 may be configured to implement one or more of the functions described below in relation to FIG. 15, including, e.g., block 1506.

In some aspects, the communication and processing software/instructions 1350 may be configured to receive a minimum first delay between the resource location of the first downlink control channel and the resource location of the downlink data associated with the first downlink control channel, the minimum first delay being configured for a BWP. For example, the communication and processing software/instructions 1350 may be configured to implement one or more of the functions described below in relation to FIG. 15, including, e.g., block 1508.

In some aspects, the communication and processing software/instructions 1350 may be configured to receive a minimum second delay between the resource location of the second downlink control channel and the resource location of the uplink data associated with the second downlink control channel, the minimum second delay being configured for the BWP. For example, the communication and processing software/instructions 1350 may be configured to implement one or more of the functions described below in relation to FIG. 15, including, e.g., block 1510.

In some aspects, the communication and processing software/instructions 1350 may be configured to receive at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel. For example, the communication and processing software/instructions 1350 may be configured to implement one or more of the functions described below in relation to FIG. 15, including, e.g., block 1578.

In some aspects, the communication and processing software/instructions 1350 may be configured to receive the downlink data in the resource location of the downlink data based on a first delay of the plurality of first delays that is configured for the first search space. For example, the communication and processing software/instructions 1350 may be configured to implement one or more of the functions described below in relation to FIG. 15, including, e.g., block 1580.

In some aspects, the communication and processing software/instructions 1350 may be configured to transmit the uplink data in the resource location of the uplink data based on the second delay of the plurality of second delays that is configured for the second search space. For example, the communication and processing software/instructions 1350 may be configured to implement one or more of the functions described below in relation to FIG. 15, including, e.g., block 1582.

In one or more examples, the processor-readable storage medium 1306 may include downlink control channel processing software/instructions 1352 configured for various functions, including, for example, performing at least one of: detection for the first downlink control channel at the plurality of first search spaces respectively based on the plurality of first delays, or detection for the second downlink control channel at the plurality of second search spaces respectively based on the plurality of second delays. For example, the downlink control channel processing software/instructions 1352 may be configured to implement one or more of the functions described below in relation to FIGS. 14 and 15, including, e.g., blocks 1406 and 1576.

In some aspects, the downlink control channel processing software/instructions 1352 may be configured, in response to receiving the at least one minimum first delay configured for the at least one first search space, to determine at least one first downlink control channel detection limit for the first downlink control channel to be over multiple slots, wherein the detection for the first downlink control channel is performed at the at least one first search space further based on the first downlink control channel detection limit over a first plurality of slots. For example, the downlink control channel processing software/instructions 1352 may be configured to implement one or more of the functions described below in relation to FIG. 15, including, e.g., block 1544.

In some aspects, the downlink control channel processing software/instructions 1352 may be configured, in response to receiving the at least one minimum second delay configured for the at least one second search space, to determine at least one second downlink control channel detection limit for the second downlink control channel to be over multiple slots, wherein the detection for the second downlink control channel is performed at the at least one second search space further based on the second downlink control channel detection limit over a second plurality of slots. For example, the downlink control channel processing software/instructions 1352 may be configured to implement one or more of the functions described below in relation to FIG. 15, including, e.g., block 1546.

In some aspects, the downlink control channel processing software/instructions 1352 may be configured to determine a first downlink control channel detection limit for the first downlink control channel to be over multiple slots if a corresponding one of the least one minimum first delay is less than or equal to a limit threshold. For example, the downlink control channel processing software/instructions 1352 may be configured to implement one or more of the functions described below in relation to FIG. 15, including, e.g., block 1548.

In some aspects, the downlink control channel processing software/instructions 1352 may be configured to determine the first downlink control channel detection limit for the first downlink control channel to be over a single slot if a corresponding one of the least one minimum first delay exceeds the limit threshold. For example, the downlink control channel processing software/instructions 1352 may be configured to implement one or more of the functions described below in relation to FIG. 15, including, e.g., block 1550.

In some aspects, the downlink control channel processing software/instructions 1352 may be configured to determine a second downlink control channel detection limit for the second downlink control channel to be over multiple slots if a corresponding one of the least one minimum second delay is less than or equal to a limit threshold. For example, the downlink control channel processing software/instructions 1352 may be configured to implement one or more of the functions described below in relation to FIG. 15, including, e.g., block 1552.

In some aspects, the downlink control channel processing software/instructions 1352 may be configured to determine the second downlink control channel detection limit for the second downlink control channel to be over a single slot if a corresponding one of the least one minimum second delay exceeds the limit threshold. For example, the downlink control channel processing software/instructions 1352 may be configured to implement one or more of the functions described below in relation to FIG. 15, including, e.g., block 1554.

Figure 14:
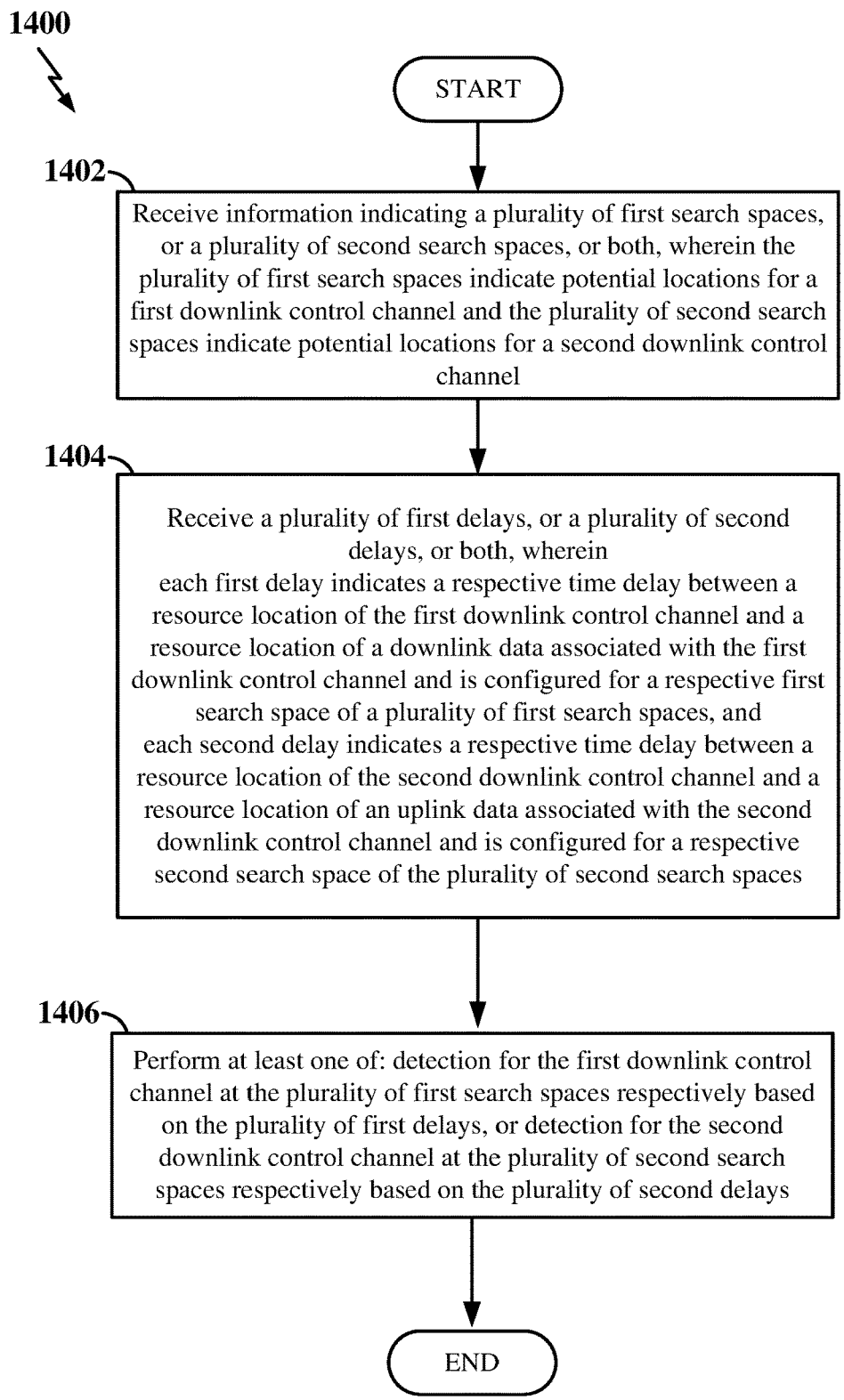
FIG. 14 is a flow chart illustrating an exemplary process (e.g., a method) of wireless communications, at a user equipment in accordance with some aspects of the disclosure.

FIG. 14 is a flow chart illustrating an exemplary process 1400 (e.g., a method) of wireless communications, at a UE in accordance with some aspects of the disclosure. As described below, some or all illustrated features may be omitted in a particular implementation within the scope of the present disclosure, and some illustrated features may not be required for implementation of all embodiments. In some examples, the process 1400 may be carried out by the user equipment 1300 illustrated in FIG. 13. In some examples, the process 1400 may be carried out by any suitable apparatus or means for carrying out the functions or algorithms described herein.

At 1402, the UE may receive information indicating a plurality of first search spaces, or a plurality of second search spaces, or both, wherein the plurality of first search spaces indicate potential locations for a first downlink control channel and the plurality of second search spaces indicate potential locations for a second downlink control channel.

At 1404, the UE may receive a plurality of first delays, or a plurality of second delays, or both, wherein each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces.

At 1406, the UE may perform at least one of: detection for the first downlink control channel at the plurality of first search spaces respectively based on the plurality of first delays, or detection for the second downlink control channel at the plurality of second search spaces respectively based on the plurality of second delays.

Figure 15A:
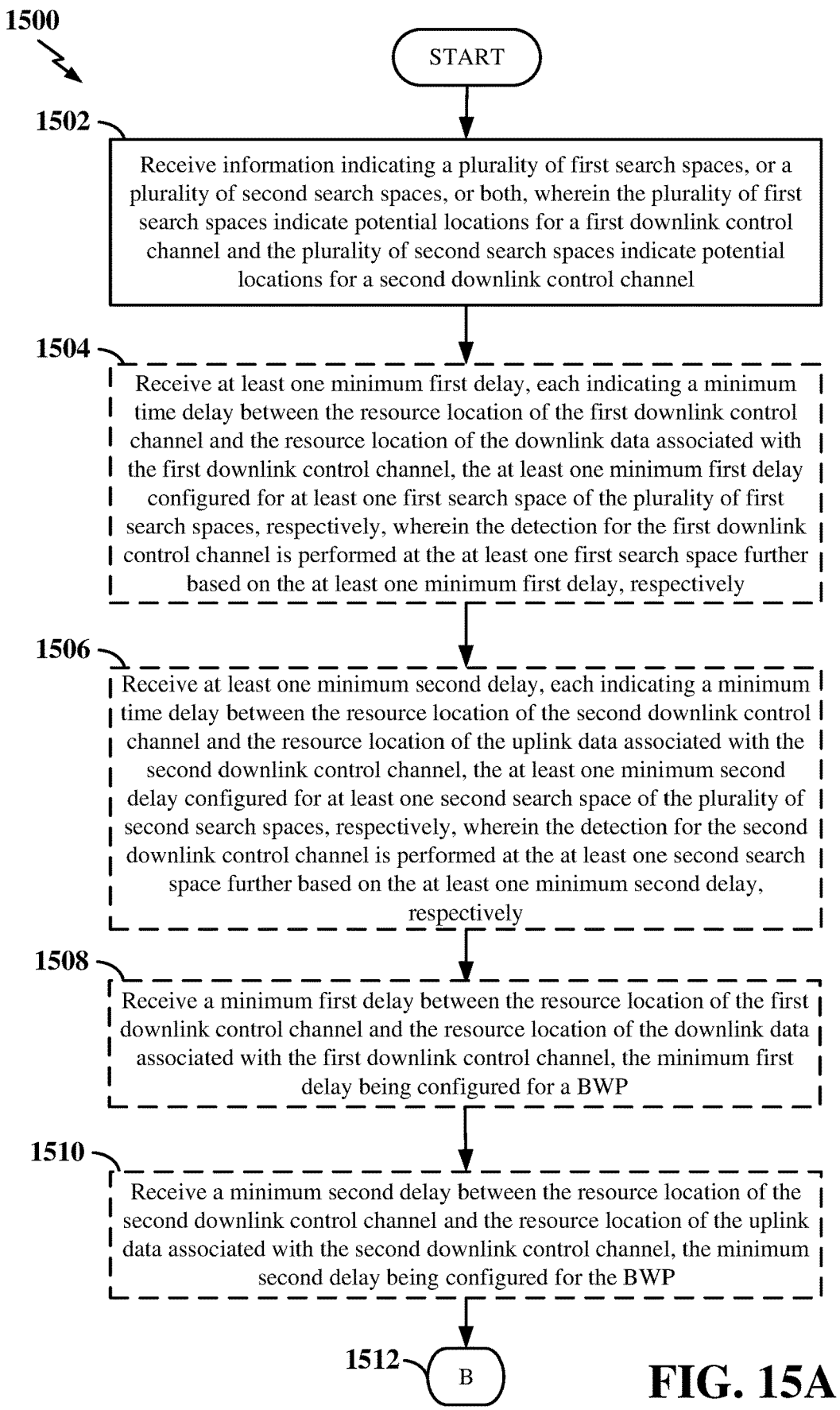
FIG. 15A is a flow chart illustrating an exemplary process (e.g., a method) of wireless communications, at a user equipment in accordance with some aspects of the disclosure.

FIG. 15A is a flow chart illustrating an exemplary process 1500 (e.g., a method) of wireless communications, at a UE in accordance with some aspects of the disclosure. As described below, some or all illustrated features may be omitted in a particular implementation within the scope of the present disclosure, and some illustrated features may not be required for implementation of all embodiments. In some examples, the process 1500 may be carried out by the user equipment 1300 illustrated in FIG. 13. In some examples, the process 1500 may be carried out by any suitable apparatus or means for carrying out the functions or algorithms described herein.

At 1502, the UE may receive information indicating a plurality of first search spaces, or a plurality of second search spaces, or both, wherein the plurality of first search spaces indicate potential locations for a first downlink control channel and the plurality of second search spaces indicate potential locations for a second downlink control channel. In an aspect, each of the plurality of first search spaces may include at least one respective first CCE, and each of the plurality of second search spaces may include at least one respective second CCE.

At 1504, the UE may receive at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively.

At 1506, the UE may receive at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively.

In an aspect, the at least one minimum first delay or the at least one minimum second delay or both may be received via an RRC message.

In an aspect, at least one periodicity respectively associated with the at least one first search space may be longer than one slot, and at least one periodicity respectively associated with the at least one second search space may be longer than one slot.

In an aspect, each of the at least one minimum first delay may be configured based on a periodicity of a respective first search space of the at least one first search space, and each of the at least one minimum second delay may be configured based on a periodicity of a respective second search space of the at least one second search space.

At 1508, the UE may receive a minimum first delay between the resource location of the first downlink control channel and the resource location of the downlink data associated with the first downlink control channel, the minimum first delay being configured for a BWP. In an aspect, the detection for the first downlink control channel may be performed at the at least one first search space based on the at least one minimum first delay while ignoring the minimum first delay configured for the BWP At 1510, the UE may receive a minimum second delay between the resource location of the second downlink control channel and the resource location of the uplink data associated with the second downlink control channel, the minimum second delay being configured for the BWP. In an aspect, the detection for the second downlink control channel may be performed at the at least one second search space based on the at least one minimum second delay while ignoring the minimum second delay configured for the BWP.

At 1512, the UE may perform additional features, as described below.

Figure 15B:
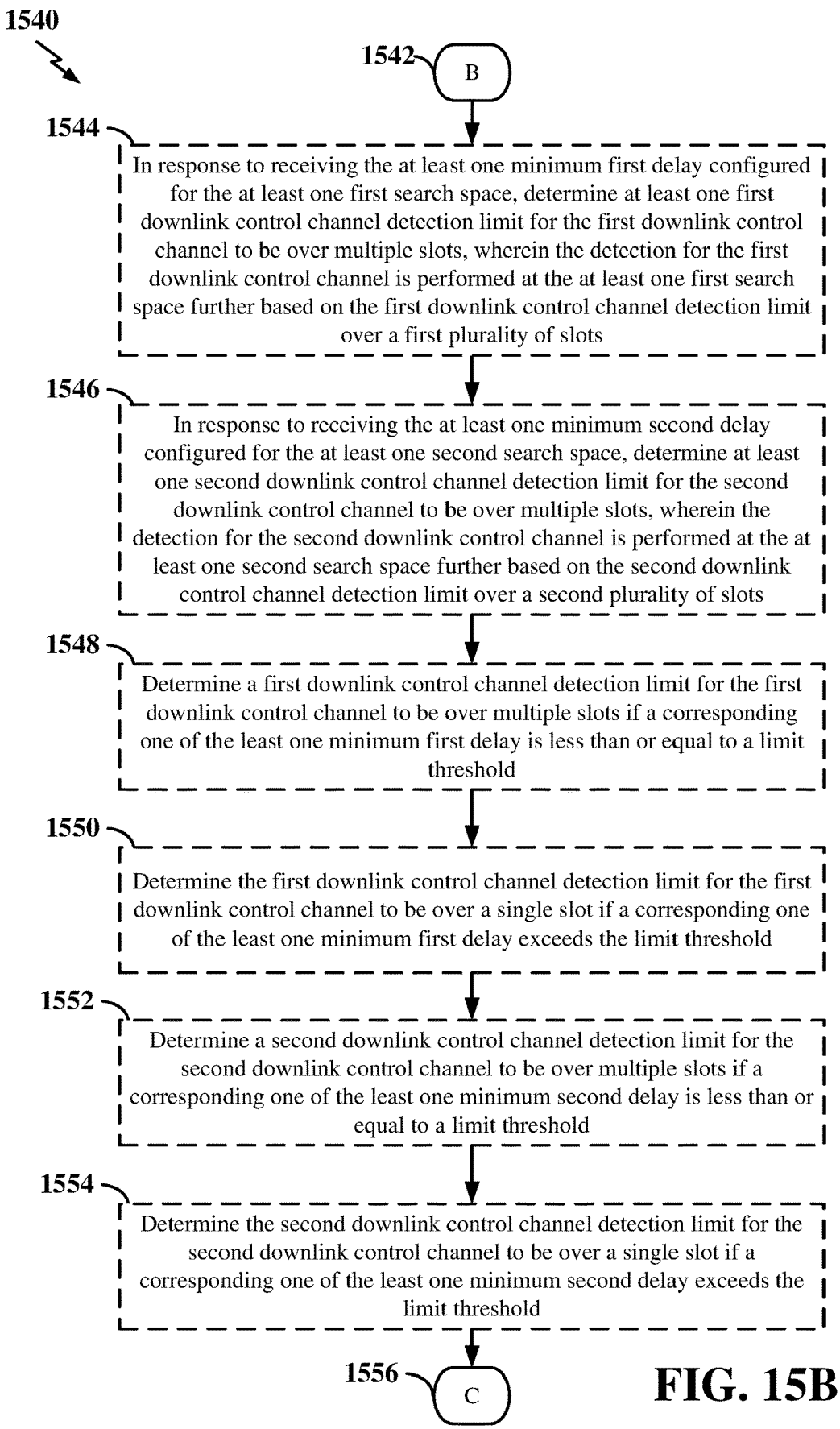
FIG. 15B is a flow chart illustrating an exemplary process (e.g., a method) of wireless communications continuing from the exemplary process of FIG. 15A, at the user equipment in accordance with some aspects of the disclosure.

FIG. 15B is a flow chart illustrating an exemplary process 1540 (e.g., a method) of wireless communications continuing from the exemplary process of FIG. 15A, at the UE in accordance with some aspects of the disclosure. At block 1542, the exemplary process 1540 may continue from the exemplary process 1500 of FIG. 15A. As described below, some or all illustrated features may be omitted in a particular implementation within the scope of the present disclosure, and some illustrated features may not be required for implementation of all embodiments. In some examples, the process 1540 may be carried out by the user equipment 1300 illustrated in FIG. 13. In some examples, the process 1540 may be carried out by any suitable apparatus or means for carrying out the functions or algorithms described herein.

At 1544, the UE may, in response to receiving the at least one minimum first delay configured for the at least one first search space, determine at least one first downlink control channel detection limit for the first downlink control channel to be over multiple slots, wherein the detection for the first downlink control channel is performed at the at least one first search space further based on the first downlink control channel detection limit over a first plurality of slots.

At 1546, the UE may, in response to receiving the at least one minimum second delay configured for the at least one second search space, determine at least one second downlink control channel detection limit for the second downlink control channel to be over multiple slots, wherein the detection for the second downlink control channel is performed at the at least one second search space further based on the second downlink control channel detection limit over a second plurality of slots.

At 1548, the UE may determine a first downlink control channel detection limit for the first downlink control channel to be over multiple slots if a corresponding one of the least one minimum first delay is less than or equal to a limit threshold.

At 1550, the UE may determine the first downlink control channel detection limit for the first downlink control channel to be over a single slot if a corresponding one of the least one minimum first delay exceeds the limit threshold.

At 1552, the UE may determine a second downlink control channel detection limit for the second downlink control channel to be over multiple slots if a corresponding one of the least one minimum second delay is less than or equal to a limit threshold.

At 1554, the UE may determine the second downlink control channel detection limit for the second downlink control channel to be over a single slot if a corresponding one of the least one minimum second delay exceeds the limit threshold.

At 1556, the UE may perform additional features, as described below.

Figure 15C:
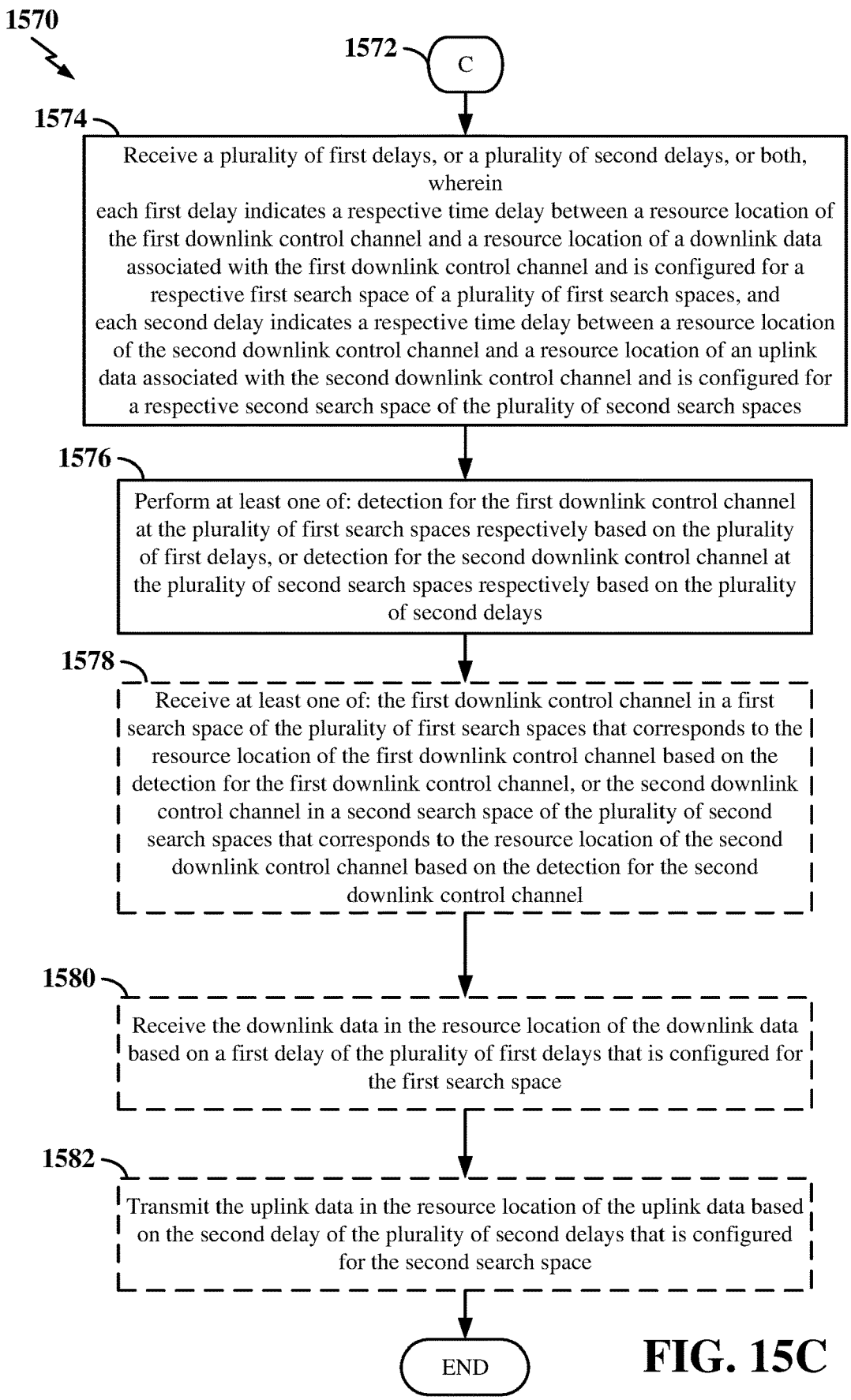
FIG. 15C is a flow chart illustrating an exemplary process (e.g., a method) of wireless communications continuing from the exemplary process of FIG. 15B, at the user equipment in accordance with some aspects of the disclosure.

FIG. 15C is a flow chart illustrating an exemplary process 1570 (e.g., a method) of wireless communications continuing from the exemplary process of FIG. 15B, at the UE in accordance with some aspects of the disclosure. At block 1572, the exemplary process 1570 may continue from the exemplary process 1540 of FIG. 15B. As described below, some or all illustrated features may be omitted in a particular implementation within the scope of the present disclosure, and some illustrated features may not be required for implementation of all embodiments. In some examples, the process 1570 may be carried out by the user equipment 1300 illustrated in FIG. 13. In some examples, the process 1570 may be carried out by any suitable apparatus or means for carrying out the functions or algorithms described herein.

At 1574, the UE may receive a plurality of first delays, or a plurality of second delays, or both, wherein each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces.

In an aspect, the resource location of the first downlink control channel and the resource location of the downlink data may be a slot location of the first downlink control channel and a slot location of the downlink data, respectively, and the resource location of the second downlink control channel and the resource location of the uplink data may be a slot location of the second downlink control channel and a slot location of the uplink data, respectively.

In an aspect, the downlink data may be received at the resource location of the downlink data based on the at least one minimum first delay when a frequency range of the first downlink control channel exceeds a frequency threshold and/or when a subcarrier spacing of the first downlink control channel exceeds a subcarrier spacing threshold, and the uplink data may be transmitted at the resource location of the uplink data based on the at least one minimum second delay when a frequency range of the second downlink control channel exceeds the frequency threshold and/or when a subcarrier spacing of the second downlink control channel exceeds the subcarrier spacing threshold.

At 1576, the UE may perform at least one of: detection for the first downlink control channel at the plurality of first search spaces respectively based on the plurality of first delays, or detection for the second downlink control channel at the plurality of second search spaces respectively based on the plurality of second delays.

At 1578, the UE may receive at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel.

At 1580, the UE may receive the downlink data in the resource location of the downlink data based on a first delay of the plurality of first delays that is configured for the first search space.

At 1582, the UE may transmit the uplink data in the resource location of the uplink data based on the second delay of the plurality of second delays that is configured for the second search space.

In one configuration, the UE 1300 for wireless communication includes means for receiving information indicating a plurality of first search spaces, or a plurality of second search spaces, or both, wherein the plurality of first search spaces indicate potential locations for a first downlink control channel and the plurality of second search spaces indicate potential locations for a second downlink control channel, means for receiving a plurality of first delays, or a plurality of second delays, or both, and means for performing at least one of detection for the first downlink control channel at the plurality of first search spaces respectively based on the plurality of first delays, or detection for the second downlink control channel at the plurality of second search spaces respectively based on the plurality of second delays. In an aspect, each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces.

In an aspect, the UE 1300 may further include means for receiving at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel. In an aspect, the UE 1300 may further include means for receiving the downlink data in the resource location of the downlink data based on a first delay of the plurality of first delays that is configured for the first search space. In an aspect, the UE 1300 may further include means for transmitting the uplink data in the resource location of the uplink data based on the second delay of the plurality of second delays that is configured for the second search space. In an aspect, the UE 1300 may further include means for receiving at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively, and/or means for receiving at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively.

In an aspect, the UE 1300 may further include means for receiving a minimum first delay between the resource location of the first downlink control channel and the resource location of the downlink data associated with the first downlink control channel, the minimum first delay being configured for a BWP, wherein the detection for the first downlink control channel is performed at the at least one first search space based on the at least one minimum first delay while ignoring the minimum first delay configured for the BWP, and/or means for receiving a minimum second delay between the resource location of the second downlink control channel and the resource location of the uplink data associated with the second downlink control channel, the minimum second delay being configured for the BWP, wherein the detection for the second downlink control channel is performed at the at least one second search space based on the at least one minimum second delay while ignoring the minimum second delay configured for the BWP. In an aspect, the UE 1300 may further include means for determining, in response to receiving the at least one minimum first delay configured for the at least one first search space, at least one first downlink control channel detection limit for the first downlink control channel to be over multiple slots, wherein the detection for the first downlink control channel is performed at the at least one first search space further based on the first downlink control channel detection limit over a first plurality of slots, and/or means for determining, in response to receiving the at least one minimum second delay configured for the at least one second search space, at least one second downlink control channel detection limit for the second downlink control channel to be over multiple slots, wherein the detection for the second downlink control channel is performed at the at least one second search space further based on the second downlink control channel detection limit over a second plurality of slots. In an aspect, the UE 1300 may further include means for determining a first downlink control channel detection limit for the first downlink control channel to be over a single slot if a corresponding one of the least one minimum first delay is less than or equal to a limit threshold, and means for determining the first downlink control channel detection limit for the first downlink control channel to be over multiple slots if a corresponding one of the least one minimum first delay exceeds the limit threshold. In an aspect, the UE 1300 may further include means for determining a second downlink control channel detection limit for the second downlink control channel to be over a single slot if a corresponding one of the least one minimum second delay is less than or equal to a limit threshold, and means for determining the second downlink control channel detection limit for the second downlink control channel to be over multiple slots if a corresponding one of the least one minimum second delay exceeds the limit threshold.

In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1004 and/or 1304 is merely provided as an example, and other means for carrying out the described functions may be included within various aspects of the present disclosure, including but not limited to the instructions stored in the processor-readable storage medium 1006 and/or 1306, or any other suitable apparatus or means described in any one of the FIGS. 1, 2, 3, 10 and/or 13, and utilizing, for example, the processes and/or algorithms described herein in relation to FIGS. 11-12 and/or FIGS. 14-15.

The following provides an overview of several aspects of the present disclosure.

Aspect 1: A method of wireless communication by a base station, comprising: determining a plurality of first search spaces indicating potential locations for a first downlink control channel or a plurality of second search spaces indicating potential locations for a second downlink control channel or both; configuring a plurality of first delays, or a plurality of second delays, or both, wherein each first delay indicates a respective time delay between a resource location of the first downlink control channel and a resource location of a downlink data associated with the first downlink control channel and is configured for a respective first search space of the plurality of first search spaces, and each second delay indicates a respective time delay between a resource location of the second downlink control channel and a resource location of an uplink data associated with the second downlink control channel and is configured for a respective second search space of the plurality of second search spaces; and transmitting the plurality of first delays or the plurality of second delays or both to a user equipment (UE).

Aspect 2: The method of aspect 1, further comprising: transmitting at least one of: the first downlink control channel in a first search space of the plurality of first search spaces that corresponds to the resource location of the first downlink control channel, or the second downlink control channel in a second search space of the plurality of second search spaces that corresponds to the resource location of the second downlink control channel.

Aspect 3: The method of aspect 2, further comprising: transmitting the downlink data in the resource location of the downlink data based on a first delay of the plurality of first delays that is configured for the first search space.

Aspect 4: The method of aspect 2 or 3, further comprising: receiving the uplink data in the resource location of the uplink data based on a second delay of the plurality of second delays that is configured for the second search space.

Aspect 5: The method of any of aspects 1 through 4, wherein the plurality of first delays are transmitted via first downlink control information on the first downlink control channel, and/or wherein the plurality of second delays are transmitted via second downlink control information on the second downlink control channel.

Aspect 6: The method of any of aspects 1 through 5, further comprising at least one of: configuring and transmitting at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively; or configuring and transmitting at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively.

Aspect 7: The method of aspect 6, wherein the at least one minimum first delay or the at least one minimum second delay or both are transmitted via a radio resource control (RRC) message.

Aspect 8: The method of aspect 6 or 7, wherein at least one periodicity respectively associated with the at least one first search space is longer than one slot, and at least one periodicity respectively associated with the at least one second search space is longer than one slot.

Aspect 9: The method of any of aspects 6 through 8, wherein each of the at least one minimum first delay is configured based on a periodicity of a respective first search space of the at least one first search space, and each of the at least one minimum second delay is configured based on a periodicity of a respective second search space of the at least one second search space.

Aspect 10: The method of any of aspects 6 through 9, wherein the at least one minimum first delay causes at least one first downlink control channel detection limit for the first downlink control channel to be over multiple slots, and the at least one minimum second delay causes at least one first downlink control channel detection limit for the second downlink control channel to be over multiple slots.

Aspect 11: The method of any of aspects 6 through 10, wherein the downlink data is transmitted at the resource location of the downlink data based on the at least one minimum first delay when a frequency range of the first downlink control channel exceeds a frequency threshold and/or when a subcarrier spacing of the first downlink control channel exceeds a subcarrier spacing threshold, and wherein the uplink data is received at the resource location of the uplink data based on the at least one minimum second delay when a frequency range of the second downlink control channel exceeds the frequency threshold and/or when a subcarrier spacing of the second downlink control channel exceeds the subcarrier spacing threshold.

Aspect 12: The method of any of aspects 1 through 11, wherein each of the plurality of first search spaces includes at least one respective first control channel element (CCE), and each of the plurality of second search spaces includes at least one respective second CCE.

Aspect 13: The method of any of aspects 1 through 12, wherein the resource location of the first downlink control channel and the resource location of the downlink data are a slot location of the first downlink control channel and a slot location of the downlink data, respectively, and wherein the resource location of the second downlink control channel and the resource location of the uplink data are a slot location of the second downlink control channel and a slot location of the uplink data, respectively.

Aspect 14: A base station comprising: a transceiver configured to communicate with a radio access network, a memory, and a processor communicatively coupled to the transceiver and the memory, wherein the processor and the memory are configured to perform any one of aspects 1 through 13.

Aspect 15: A base station configured for wireless communication comprising at least one means for performing any one of aspects 1 through 13.

Aspect 16: A non-transitory processor-readable storage medium having instructions for a base station thereon, wherein the instructions, when executed by a processing circuit, cause the processing circuit to perform any one of aspects 1 through 13.

Aspect 17: A method of wireless communication by a user equipment (UE), comprising: receiving information indicating a plurality of first search spaces, or a plurality of second search spaces, or both, wherein the plurality of first search spaces indicate potential locations for a first downlink control channel and the plurality of second search spaces indicate potential locations for a second downlink control channel; receiving a plurality of first delays, or a plurality of second delays, or both, wherein each first delay indicates a respective time delay between a resource location of the first downlink control channel and a resource location of a downlink data associated with the first downlink control channel and is configured for a respective first search space of a plurality of first search spaces, and each second delay indicates a respective time delay between a resource location of the second downlink control channel and a resource location of an uplink data associated with the second downlink control channel and is configured for a respective second search space of the plurality of second search spaces; and performing at least one of: detection for the first downlink control channel at the plurality of first search spaces respectively based on the plurality of first delays, or detection for the second downlink control channel at the plurality of second search spaces respectively based on the plurality of second delays.

Aspect 18: The method of aspect 17, further comprising: receiving at least one of: the first downlink control channel in a first search space of the plurality of first search spaces that corresponds to the resource location of the first downlink control channel based on the detection for the first downlink control channel, or the second downlink control channel in a second search space of the plurality of second search spaces that corresponds to the resource location of the second downlink control channel based on the detection for the second downlink control channel.

Aspect 19: The method of aspect 18, further comprising: receiving the downlink data in the resource location of the downlink data based on a first delay of the plurality of first delays that is configured for the first search space.

Aspect 20: The method of aspect 18 or 19, further comprising: transmitting the uplink data in the resource location of the uplink data based on the second delay of the plurality of second delays that is configured for the second search space.

Aspect 21: The method of any of aspects 17 through 20, wherein the plurality of first delays are received via first downlink control information on the first downlink control channel, and/or wherein the plurality of second delays are received via second downlink control information on the second downlink control channel.

Aspect 22: The method of any of aspects 17 through 21, further comprising at least one of: receiving at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively; or receiving at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively.

Aspect 23: The method of aspect 22, wherein the at least one minimum first delay or the at least one minimum second delay or both are received via a radio resource control (RRC) message.

Aspect 24: The method of aspect 22 or 23, further comprising at least one of: receiving a minimum first delay between the resource location of the first downlink control channel and the resource location of the downlink data associated with the first downlink control channel, the minimum first delay being configured for a bandwidth part (BWP), wherein the detection for the first downlink control channel is performed at the at least one first search space based on the at least one minimum first delay while ignoring the minimum first delay configured for the BWP; or receiving a minimum second delay between the resource location of the second downlink control channel and the resource location of the uplink data associated with the second downlink control channel, the minimum second delay being configured for the BWP, wherein the detection for the second downlink control channel is performed at the at least one second search space based on the at least one minimum second delay while ignoring the minimum second delay configured for the BWP.

Aspect 25: The method of any of aspects 22 through 24, wherein at least one periodicity respectively associated with the at least one first search space is longer than one slot, and at least one periodicity respectively associated with the at least one second search space is longer than one slot.

Aspect 26: The method of any of aspects 22 through 25, further comprising at least one of: in response to receiving the at least one minimum first delay configured for the at least one first search space, determining at least one first downlink control channel detection limit for the first downlink control channel to be over multiple slots, wherein the detection for the first downlink control channel is performed at the at least one first search space further based on the first downlink control channel detection limit over a first plurality of slots; or in response to receiving the at least one minimum second delay configured for the at least one second search space, determining at least one second downlink control channel detection limit for the second downlink control channel to be over multiple slots, wherein the detection for the second downlink control channel is performed at the at least one second search space further based on the second downlink control channel detection limit over a second plurality of slots.

Aspect 27: The method of any of aspects 22 through 26, further comprising: determining a first downlink control channel detection limit for the first downlink control channel to be over a single slot if a corresponding one of the least one minimum first delay is less than or equal to a limit threshold; and determining the first downlink control channel detection limit for the first downlink control channel to be over multiple slots if a corresponding one of the least one minimum first delay exceeds the limit threshold.

Aspect 28: The method of any of aspects 22 through 27, further comprising: determining a second downlink control channel detection limit for the second downlink control channel to be over a single slot if a corresponding one of the least one minimum second delay is less than or equal to a limit threshold; and determining the second downlink control channel detection limit for the second downlink control channel to be over multiple slots if a corresponding one of the least one minimum second delay exceeds the limit threshold.

Aspect 29: The method of any of aspects 22 through 28, wherein each of the at least one minimum first delay is configured based on a periodicity of a respective first search space of the at least one first search space, and each of the at least one minimum second delay is configured based on a periodicity of a respective second search space of the at least one second search space.

Aspect 30: The method of any of aspects 22 through 29, wherein the downlink data is received at the resource location of the downlink data based on the at least one minimum first delay when a frequency range of the first downlink control channel exceeds a frequency threshold and/or when a subcarrier spacing of the first downlink control channel exceeds a subcarrier spacing threshold, and wherein the uplink data is transmitted at the resource location of the uplink data based on the at least one minimum second delay when a frequency range of the second downlink control channel exceeds the frequency threshold and/or when a subcarrier spacing of the second downlink control channel exceeds the subcarrier spacing threshold.

Aspect 31: The method of any of aspects 17 through 30, wherein each of the plurality of first search spaces includes at least one respective first control channel element (CCE), and each of the plurality of second search spaces includes at least one respective second CCE.

Aspect 32: The method of any of aspects 17 through 31, wherein the resource location of the first downlink control channel and the resource location of the downlink data are a slot location of the first downlink control channel and a slot location of the downlink data, respectively, and wherein the resource location of the second downlink control channel and the resource location of the uplink data are a slot location of the second downlink control channel and a slot location of the uplink data, respectively.

Aspect 33: A user equipment (UE) comprising: a transceiver configured to communicate with a radio access network, a memory, and a processor communicatively coupled to the transceiver and the memory, wherein the processor and the memory are configured to perform any one of aspects 17 through 32.

Aspect 34: A UE configured for wireless communication comprising at least one means for performing any one of aspects 17 through 32.

Aspect 35: A non-transitory processor-readable storage medium having instructions for a UE thereon, wherein the instructions, when executed by a processing circuit, cause the processing circuit to perform any one of aspects 17 through 32.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a base station, comprising:
   determining a plurality of first search spaces indicating potential locations for a first downlink control channel or a plurality of second search spaces indicating potential locations for a second downlink control channel or both, the plurality of first search spaces and the plurality of second search spaces being within a bandwidth part (BWP);
   configuring a plurality of first delays respectively for the plurality of first search spaces, or a plurality of second delays respectively for the plurality of second search spaces, or both, wherein
      each first delay indicates a respective time delay between a resource location of the first downlink control channel and a resource location of a downlink data associated with the first downlink control channel and is configured for a respective first search space of the plurality of first search spaces that are within the BWP, and
      each second delay indicates a respective time delay between a resource location of the second downlink control channel and a resource location of an uplink data associated with the second downlink control channel and is configured for a respective second search space of the plurality of second search spaces that are within the BWP; and
   transmitting the plurality of first delays or the plurality of second delays or both to a user equipment (UE).

2. The method of claim 1, further comprising:
   transmitting at least one of:
      the first downlink control channel in a first search space of the plurality of first search spaces that corresponds to the resource location of the first downlink control channel, or
      the second downlink control channel in a second search space of the plurality of second search spaces that corresponds to the resource location of the second downlink control channel.

3. The method of claim 2, further comprising at least one of:
   transmitting the downlink data in the resource location of the downlink data based on a first delay of the plurality of first delays that is configured for the first search space, or
   receiving the uplink data in the resource location of the uplink data based on a second delay of the plurality of second delays that is configured for the second search space.

4. The method of claim 1, wherein the plurality of first delays are transmitted via first downlink control information on the first downlink control channel, and/or wherein the plurality of second delays are transmitted via second downlink control information on the second downlink control channel.

5. The method of claim 1, further comprising at least one of:
   configuring and transmitting at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively; or
   configuring and transmitting at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively.

6. The method of claim 5, wherein at least one periodicity respectively associated with the at least one first search space is longer than one slot, and at least one periodicity respectively associated with the at least one second search space is longer than one slot.

7. The method of claim 5, wherein each of the at least one minimum first delay is configured based on a periodicity of a respective first search space of the at least one first search space, and each of the at least one minimum second delay is configured based on a periodicity of a respective second search space of the at least one second search space.

8. The method of claim 5, wherein the at least one minimum first delay causes at least one first downlink control channel detection limit for the first downlink control channel to be over multiple slots, and the at least one minimum second delay causes at least one first downlink control channel detection limit for the second downlink control channel to be over multiple slots.

9. The method of claim 5, wherein the downlink data is transmitted at the resource location of the downlink data based on the at least one minimum first delay when a frequency range of the first downlink control channel exceeds a frequency threshold and/or when a subcarrier spacing of the first downlink control channel exceeds a subcarrier spacing threshold, and wherein the uplink data is received at the resource location of the uplink data based on the at least one minimum second delay when a frequency range of the second downlink control channel exceeds the frequency threshold and/or when a subcarrier spacing of the second downlink control channel exceeds the subcarrier spacing threshold.

10. A base station for wireless communication, comprising:
at least one processor;
a transceiver communicatively coupled to the at least one processor; and
a memory communicatively coupled to the at least one processor,
wherein the processor is configured to:
determine a plurality of first search spaces indicating potential locations for a first downlink control channel or a plurality of second search spaces indicating potential locations for a second downlink control channel or both, the plurality of first search spaces and the plurality of second search spaces being within a bandwidth part (BWP);
configure a plurality of first delays respectively for the plurality of first search spaces, or a plurality of second delays respectively for the plurality of second search spaces, or both, wherein
each first delay indicates a respective time delay between a resource location of the first downlink control channel and a resource location of a downlink data associated with the first downlink control channel and is configured for a respective first search space of the plurality of first search spaces that are within the BWP, and
each second delay indicates a respective time delay between a resource location of the second downlink control channel and a resource location of an uplink data associated with the second downlink control channel and is configured for a respective second search space of the plurality of second search spaces that are within the BWP; and
transmit the plurality of first delays or the plurality of second delays or both to a user equipment (UE).

11. The base station of claim 10, wherein the at least one processor is further configured to:
transmit at least one of:
the first downlink control channel in a first search space of the plurality of first search spaces that corresponds to the resource location of the first downlink control channel or
the second downlink control channel in a second search space of the plurality of second search spaces that corresponds to the resource location of the second downlink control channel.

12. The base station of claim 11, wherein the at least one processor is further configured to perform at least one of:
transmitting the downlink data in the resource location of the downlink data based on a first delay of the plurality of first delays that is configured for the first search space; or
receiving the uplink data in the resource location of the uplink data based on a second delay of the plurality of second delays that is configured for the second search space.

13. The base station of claim 10, wherein the at least one processor is further configured to perform at least one of:
configuring and transmitting at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively; or
configuring and transmitting at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively.

14. A method of wireless communication by a user equipment (UE), comprising:
receiving information indicating a plurality of first search spaces, or a plurality of second search spaces, or both, wherein the plurality of first search spaces indicate potential locations for a first downlink control channel and the plurality of second search spaces indicate potential locations for a second downlink control channel, the plurality of first search spaces and the plurality of second search spaces being within a bandwidth part (BWP);
receiving a plurality of first delays respectively for the plurality of first search spaces, or a plurality of second delays respectively for the plurality of second search spaces, or both, wherein
each first delay indicates a respective time delay between a resource location of the first downlink control channel and a resource location of a downlink data associated with the first downlink control channel and is configured for a respective first search space of a plurality of first search spaces that are within the BWP, and
each second delay indicates a respective time delay between a resource location of the second downlink control channel and a resource location of an uplink data associated with the second downlink control channel and is configured for a respective second search space of the plurality of second search spaces that are within the BWP; and performing at least one of:
- detection for the first downlink control channel at the plurality of first search spaces respectively based on the plurality of first delays, or
- detection for the second downlink control channel at the plurality of second search spaces respectively based on the plurality of second delays.

15. The method of claim 14, further comprising:
receiving at least one of:
- the first downlink control channel in a first search space of the plurality of first search spaces that corresponds to the resource location of the first downlink control channel based on the detection for the first downlink control channel, or
- the second downlink control channel in a second search space of the plurality of second search spaces that corresponds to the resource location of the second downlink control channel based on the detection for the second downlink control channel.

16. The method of claim 15, further comprising at least one of:
- receiving the downlink data in the resource location of the downlink data based on a first delay of the plurality of first delays that is configured for the first search space, or
- transmitting the uplink data in the resource location of the uplink data based on the second delay of the plurality of second delays that is configured for the second search space.

17. The method of claim 14, wherein the plurality of first delays are received via first downlink control information on the first downlink control channel, and/or wherein the plurality of second delays are received via second downlink control information on the second downlink control channel.

18. The method of claim 14, further comprising at least one of:
- receiving at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively; or
- receiving at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively.

19. The method of claim 18, further comprising at least one of:
- receiving a minimum first delay between the resource location of the first downlink control channel and the resource location of the downlink data associated with the first downlink control channel, the minimum first delay being configured for the BWP, wherein the detection for the first downlink control channel is performed at the at least one first search space based on the at least one minimum first delay while ignoring the minimum first delay configured for the BWP; or
- receiving a minimum second delay between the resource location of the second downlink control channel and the resource location of the uplink data associated with the second downlink control channel, the minimum second delay being configured for the BWP, wherein the detection for the second downlink control channel is performed at the at least one second search space based on the at least one minimum second delay while ignoring the minimum second delay configured for the BWP.

20. The method of claim 18, wherein at least one periodicity respectively associated with the at least one first search space is longer than one slot, and at least one periodicity respectively associated with the at least one second search space is longer than one slot.

21. The method of claim 18, further comprising at least one of:
- in response to receiving the at least one minimum first delay configured for the at least one first search space, determining at least one first downlink control channel detection limit for the first downlink control channel to be over multiple slots, wherein the detection for the first downlink control channel is performed at the at least one first search space further based on the first downlink control channel detection limit over a first plurality of slots; or
- in response to receiving the at least one minimum second delay configured for the at least one second search space, determining at least one second downlink control channel detection limit for the second downlink control channel to be over multiple slots, wherein the detection for the second downlink control channel is performed at the at least one second search space further based on the second downlink control channel detection limit over a second plurality of slots.

22. The method of claim 18, further comprising:
- determining a first downlink control channel detection limit for the first downlink control channel to be over a single slot if a corresponding one of the least one minimum first delay is less than or equal to a limit threshold; and
- determining the first downlink control channel detection limit for the first downlink control channel to be over multiple slots if a corresponding one of the least one minimum first delay exceeds the limit threshold.

23. The method of claim 18, further comprising:
- determining a second downlink control channel detection limit for the second downlink control channel to be over a single slot if a corresponding one of the least one minimum second delay is less than or equal to a limit threshold; and
- determining the second downlink control channel detection limit for the second downlink control channel to be over multiple slots if a corresponding one of the least one minimum second delay exceeds the limit threshold.

24. The method of claim 18, wherein each of the at least one minimum first delay is configured based on a periodicity of a respective first search space of the at least one first search space, and each of the at least one minimum second delay is configured based on a periodicity of a respective second search space of the at least one second search space.

25. The method of claim 18, wherein the downlink data is received at the resource location of the downlink data based on the at least one minimum first delay when a frequency range of the first downlink control channel exceeds a frequency threshold and/or when a subcarrier spacing of the first downlink control channel exceeds a subcarrier spacing threshold, and
wherein the uplink data is transmitted at the resource location of the uplink data based on the at least one minimum second delay when a frequency range of the second downlink control channel exceeds the frequency threshold and/or when a subcarrier spacing of the second downlink control channel exceeds the subcarrier spacing threshold.

26. A user equipment (UE) for wireless communication, comprising:
at least one processor;
a transceiver communicatively coupled to the at least one processor; and
a memory communicatively coupled to the at least one processor,
wherein the processor is configured to:
receive information indicating a plurality of first search spaces, or a plurality of second search spaces, or both, wherein the plurality of first search spaces indicate potential locations for a first downlink control channel and the plurality of second search spaces indicate potential locations for a second downlink control channel, the plurality of first search spaces and the plurality of second search spaces being within a bandwidth part (BWP);
receive a plurality of first delays respectively for the plurality of first search spaces, or a plurality of second delays respectively for the plurality of second search spaces, or both, wherein
each first delay indicates a respective time delay between a resource location of the first downlink control channel and a resource location of a downlink data associated with the first downlink control channel and is configured for a respective first search space of a plurality of first search spaces that are within the BWP, and
each second delay indicates a respective time delay between a resource location of the second downlink control channel and a resource location of an uplink data associated with the second downlink control channel and is configured for a respective second search space of the plurality of second search spaces that are within the BWP; and
perform at least one of:
detection for the first downlink control channel at the plurality of first search spaces respectively based on the plurality of first delays, or
detection for the second downlink control channel at the plurality of second search spaces respectively based on the plurality of second delays.

27. The UE of claim 26, wherein the at least one processor is further configured to:
receive at least one of:
the first downlink control channel in a first search space of the plurality of first search spaces that corresponds to the resource location of the first downlink control channel based on the detection for the first downlink control channel, or
the second downlink control channel in a second search space of the plurality of second search spaces that corresponds to the resource location of the second downlink control channel based on the detection for the second downlink control channel.

28. The UE of claim 27, wherein the at least one processor is further configured to perform at least one of:
receiving the downlink data in the resource location of the downlink data based on a first delay of the plurality of first delays that is configured for the first search space; or
transmitting the uplink data in the resource location of the uplink data based on the second delay of the plurality of second delays that is configured for the second search space.

29. The UE of claim 26, wherein the at least one processor is further configured to perform at least one of:
receiving at least one minimum first delay, each indicating a minimum time delay between the resource location of the first downlink control channel and the resource location of the downlink data associated with the first downlink control channel, the at least one minimum first delay configured for at least one first search space of the plurality of first search spaces, respectively, wherein the detection for the first downlink control channel is performed at the at least one first search space further based on the at least one minimum first delay, respectively; or
receiving at least one minimum second delay, each indicating a minimum time delay between the resource location of the second downlink control channel and the resource location of the uplink data associated with the second downlink control channel, the at least one minimum second delay configured for at least one second search space of the plurality of second search spaces, respectively, wherein the detection for the second downlink control channel is performed at the at least one second search space further based on the at least one minimum second delay, respectively.

30. The UE of claim 29, wherein the at least one processor is further configured to perform at least one of:
receiving a minimum first delay between the resource location of the first downlink control channel and the resource location of the downlink data associated with the first downlink control channel, the minimum first delay being configured for the BWP, wherein the detection for the first downlink control channel is performed at the at least one first search space based on the at least one minimum first delay while ignoring the minimum first delay configured for the BWP; or
receiving a minimum second delay between the resource location of the second downlink control channel and the resource location of the uplink data associated with the second downlink control channel, the minimum second delay being configured for the BWP, wherein the detection for the second downlink control channel is performed at the at least one second search space based on the at least one minimum second delay while ignoring the minimum second delay configured for the BWP.

* * * * *